United States Patent
Wahlstrom et al.

(10) Patent No.: US 10,548,035 B2
(45) Date of Patent: Jan. 28, 2020

(54) DIAGNOSTIC ANALYZER FOR CONTENT RECEIVER USING WIRELESS EXECUTION DEVICE

(71) Applicant: Pearson Education, Inc., New York, NY (US)

(72) Inventors: Dustin B. Wahlstrom, Austin, TX (US); Kristina Breaux, Houston, TX (US); James Holdnack, Bear, DE (US); Lawrence G. Weiss, San Antonio, TX (US)

(73) Assignee: PEARSON EDUCATION, INC., New York, NY (US)

( * ) Notice: Subject to any disclaimer, the term of this patent is extended or adjusted under 35 U.S.C. 154(b) by 0 days.

(21) Appl. No.: 16/186,254

(22) Filed: Nov. 9, 2018

(65) Prior Publication Data

US 2019/0082336 A1    Mar. 14, 2019

Related U.S. Application Data

(63) Continuation of application No. 15/638,018, filed on Jun. 29, 2017, now Pat. No. 10,172,022.

(51) Int. Cl.
| | |
|---|---|
| *H04L 12/26* | (2006.01) |
| *H04W 24/06* | (2009.01) |
| *H04W 24/10* | (2009.01) |
| *H04W 24/02* | (2009.01) |

(52) U.S. Cl.
CPC .......... *H04W 24/06* (2013.01); *H04W 24/10* (2013.01); *H04L 43/0876* (2013.01); *H04W 24/02* (2013.01)

(58) Field of Classification Search
CPC .............................. H04W 24/06; H04W 24/10
USPC ................... 370/241–245, 248–252
See application file for complete search history.

(56) References Cited

U.S. PATENT DOCUMENTS

| | | | |
|---|---|---|---|
| 8,189,487 B1 * | 5/2012 | Mateski | H04L 69/22 370/242 |
| 8,856,211 B1 * | 10/2014 | Kassamali | H04L 43/50 709/203 |
| 10,172,022 B1 * | 1/2019 | Wahlstrom | H04W 24/10 |
| 2013/0272146 A1 * | 10/2013 | Jones | H04L 43/50 370/252 |
| 2017/0126763 A1 * | 5/2017 | Bae | H04N 21/20 |
| 2018/0032674 A1 * | 2/2018 | Asada | G02B 13/08 |

* cited by examiner

*Primary Examiner* — Thai D Hoang
(74) *Attorney, Agent, or Firm* — Quarles and Brady LLP

(57) ABSTRACT

Techniques described herein relate to performing wireless diagnostic analyses including execution and evaluations of interactive content resources executed by execution devices on and/or for separate content receiver devices. A multiphrase diagnostic session may proceed with an execution of an initial set of diagnostic modules on an execution device, during which interactive content is transmitted/received from a connected receiver device. The results of the diagnostic modules may be evaluated in real-time and transmitted to a diagnostic analyzer server to select additional diagnostic modules for execution during the diagnostic session. The diagnostic analyzer server may select the additional diagnostic modules based on based on response data received via the content execution device to the interactive content of the previously executed diagnostic modules, and/or data received from additional data sources related to the content receiver.

20 Claims, 15 Drawing Sheets

DIAGNOSES

| | Diagnosis 1 | Diagnosis 2 | Diagnosis 3 | Diagnosis 4 | Diagnosis 5 |
|---|---|---|---|---|---|
| Characteristic 1 | <Score> | <Score> | <Score> | <Score> | <Score> |
| Characteristic 2 | <Score> | <Score> | <Score> | <Score> | <Score> |
| Characteristic 3 | <Score> | <Score> | <Score> | <Score> | <Score> |
| Characteristic 4 | <Score> | <Score> | <Score> | <Score> | <Score> |
| Characteristic 5 | <Score> | <Score> | <Score> | <Score> | <Score> |
| Characteristic 6 | <Score> | <Score> | <Score> | <Score> | <Score> |

CHARACTERISTICS

FIG. 12A

|  | Dyslexia ||| Comprehension | Fluency | Language | Global |
|---|---|---|---|---|---|---|---|
|  | Phonological | Orthographic | Mixed |  |  |  |  |
| Construct |  |  |  |  |  |  |  |
| Listening comprehension | Adequate | Adequate | Adequate | Weak | - | Weak | Weak |
| Reading comprehension | - | - | - | Weak | - | Weak | Weak |
| Word Recognition | - | Weak | Weak | Adequate | Adequate | Weak | Weak |
| Decoding | Weak | - | Weak | Adequate | Adequate | - | - |
| Oral reading of passages | Weak | - | Weak | Adequate | Weak | - | Weak |
| Spelling by dictation | Weak | - | Weak | - | - | - | - |
| Oral expression | - | - | - | - | - | Weak | - |
| Written expression | - | - | - | - | - | Weak | - |

DIAGNOSTIC ANALYZER FOR CONTENT RECEIVER USING WIRELESS EXECUTION DEVICE

CROSS-REFERENCE TO RELATED APPLICATIONS

This application is a continuation of U.S. patent application Ser. No. 15/638,018 entitled "DIAGNOSTIC ANALYZER FOR CONTENT RECEIVER USING WIRELESS EXECUTION DEVICE" and filed on Jun. 29, 2017.

BACKGROUND

Using content delivery network infrastructures and content receiver devices such as laptop and desktop client computers, tablet devices, televisions, etc., upstream content providers can provide vast and diverse content resources to users live, live-streamed, and on-demand. In some cases, content distribution networks and systems may generate and provide various interactive content resources to content receiver devices using various delivery techniques. Such interactive content resources may include, for example, audio and video media content, gaming software, professional training and educational content resources, clinical assessments administered by educators or medical personnel to students or patients, and the like. In some cases, the devices executing and providing the content resources to users may receive and analyze responses and other feedback data associated with the execution of the content resources, and may return such data to the content provider via one or more feedback channels. For example, the content provider may receive feedback from a content receiver device on the content or the quality of the content delivery. Additional feedback may correspond to the execution status of resource(s) on the content receiver device, while other feedback may relate to interactive user responses provided during or after execution of content resources.

BRIEF SUMMARY

Various techniques are described herein for performing wireless diagnostic analyses including execution and evaluations of interactive content resources executed by execution devices on and/or for separate content receiver devices. In some embodiments, multi-phrase diagnostic sessions may include executions of successive sets of diagnostic modules on interactive content execution devices. During the execution of the diagnostic modules, an interactive content execution device may transmit data to and/or receive data from one or more interactive content receiver devices connected to the interactive content execution device. The results of diagnostic modules may be evaluated and/or scored by the execution device, and then transmitted to a diagnostic analyzer server. The diagnostic analyzer server may analyze the results and select additional diagnostic modules for execution during the same diagnostic session and/or subsequent diagnostic sessions. Such analyses may be based on receiver response/performance data received via the execution device to the previously executed diagnostic modules, along with data received from additional data sources related to the content receiver.

In accordance with certain embodiments described herein, wireless interactive diagnostic systems may be implemented including a diagnostic analyzer server, an interactive content execution device, and one or more interactive content receiver devices. Wireless connections may be established between the interactive content execution device and the receiver devices, for example, Bluetooth connections or other short-range wireless connections, while the interactive content execution device may communicate with the diagnostic analyzer server via a separate secure connection over a packet-switched network. Interactive content execution devices may be configured to receive selections of diagnostic modules comprising interactive content resources, and then initiate execution of the diagnostic modules for a particular content receiver device. During the execution of the diagnostic modules, an interactive content execution device may transmit interactive content to and receive response data from the particular content receiver device. The content execution device may analyze the results/responses to the interactive content, evaluate and/or score the performance of the receiver, and then transmit the evaluation/score to the diagnostic analyzer server. The diagnostic analyzer server may analyze the evaluations/scores in real-time or near real-time and select additional diagnostic modules for the receiver. The additional diagnostic modules may be transmitted back to the content execution device, which may initiate the execution and transmit the additional interactive content to the content receiver devices.

Additional techniques described herein relate to the analyses and selection of additional diagnostic modules by the diagnostic analyzer device. In some cases, such selection may happen in real-time during a diagnostic session between a content executor and content receiver. As noted above, the diagnostic analyzer device may receive sets of evaluations/scores from a content execution device, based on the responses to the interactive content received from content receiver devices. In some embodiments, the diagnostic analyzer device may also retrieve/receive additional previously collected entity records associated with the recipient of the interactive content. The diagnostic analyzer device then may determine one or more subsequent diagnostic modules for particular recipients of the interactive content, based on the received performance measurements and the previously collected entity records associated with the particular interactive content recipient. The selection of subsequent diagnostic modules may include, for example, determining multiple possible diagnoses for particular interactive content recipients, ranking the multiple possible diagnoses for probability/likelihood, based on analytics data correlating probabilities of diagnoses to evaluation results/scores of a previously executed set of diagnostic modules. The determined probabilities may be based on predetermined statistical data and/or trained machine learning algorithms. After determining the highest probability diagnosis (or multiple high-probability diagnoses), the additional diagnostic modules may be selected based on analyses of a library of potential additional diagnostic modules, and calculations of the amounts of change to the diagnostic probabilities that are projected to result from the execution of the particular additional diagnostic modules. For instance, diagnostic modules that are projected to significantly change the diagnostic probabilities of one or more of the high-probability diagnoses may be selected over additional diagnostic modules that are projected to result in less or no change to the diagnostic probabilities. Finally, there may be subsequent diagnostic modules may be selected by and/or transmitted to the interactive content execution device, from the diagnostic analyzer device, to be executed and provided to the interactive content recipient.

Further techniques and areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIGS. 12A and 12B are example mappings between a plurality of characteristics and a plurality of diagnoses used for assessment analysis, diagnosis, and selection of subsequent diagnostic modules, according to one or more embodiments of the disclosure.

DETAILED DESCRIPTION

Figure 1:
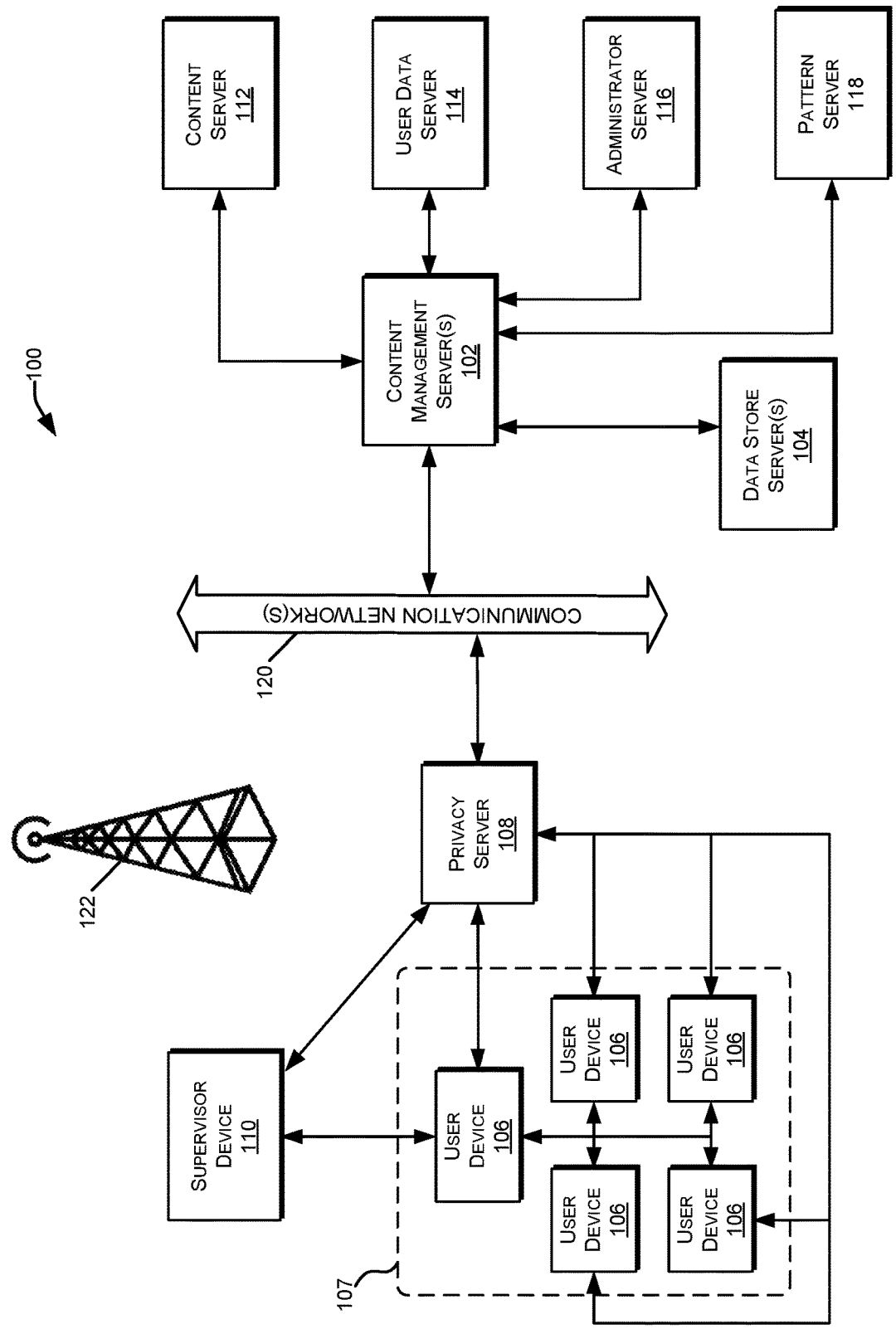
FIG. 1 is a block diagram illustrating an example content distribution network in accordance with one or more embodiments of the disclosure.

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Embodiments of the present disclosure may be performed within content distribution networks implemented to transmit/receive content such as training, entertainment, assessment, and evaluation content, among many other types of content. Content can be delivered on-demand to devices operated by users in remote or local locations or can be delivered live in a present local or live-streamed to remote locations. In some cases, client execution devices and/or users receiving the content may provide feedback relating to the execution of the content. In this context, various techniques (e.g., systems, methods, computer-program products tangibly embodied in a non-transitory machine-readable storage medium, etc.) are described herein relating to performing wireless diagnostic analyses including execution and evaluations of interactive content resources executed by execution devices on and/or for separate content receiver devices. For example, techniques described herein may include analyzing the execution of content resources, which may be initiated and monitored execution client devices configured to transmit interactive content to separate receiver client devices. Additionally, the execution client devices may communicate with a diagnostic analyzer to select and retreive sets of interactive content resources in the form of diagnostic modules (e.g., assessments) for execution on particular execution devices (e.g., for particular receiver devices) based on such analyses. In some embodiments, content resource execution data, corresponding to the responses and/or feedback received from the receiver devices, may be received from execution devices on which content resources have been executed and provided to end users via the receiver client devices. Such interactive content resources may include, for example, audio and video media resources, gaming software resources, professional training and educational resources, clinical assessment resources, and the like. In some cases, the interactive content resources may be in the form of diagnostic software modules designed to perform diagnostic consulting tasks for clinicians when classifying and diagnosing examinee users (e.g., individual students, patients, trainees, gamers, etc.) Response or feedback data corresponding to the execution of content resources via execution devices may be received and stored in one or more data structures storing associations between particular content resources and particular examinees (and/or particular content executors). The data structures may be analyzed to determine correlations between particular characteristics, skills, or traits of an examinee, and potential diagnoses that may apply to the examined. After determining such correlations, content execution devices and/or diagnostic analyzer servers may select additional interactive content resources to continue a diagnostic assessment of the content receiver/examinee, and the selections may be provided to content execution device during a content execution session following an authenticated login by the content executor and/or the content receiver.

In some embodiments, multi-phase diagnostic sessions may include executions of successive sets of diagnostic modules on interactive content execution devices. During the execution of the diagnostic modules, an interactive content execution device may transmit data to and/or receive data from interactive one or more interactive content receiver devices connected to the interactive content execution device. The results of diagnostic modules may be evaluated and/or scored by the execution device, and then transmitted to a diagnostic analyzer server. The diagnostic analyzer server may analyze the results and select additional diagnostic modules for execution during the same diagnostic session and/or subsequent diagnostic sessions. Such analyses may be based on receiver response/performance data received via the execution device to the previously executed diagnostic modules, along with data received from additional data sources related to the content receiver.

For example, a wireless interactive diagnostic system may be implemented within a computing environment including a diagnostic analyzer server, an interactive content execution device, and one or more interactive content receiver devices. Wireless connections may be established between the interactive content execution device and the receiver devices, for example, Bluetooth connections or other short-range wireless connections, while the interactive content execution device may communicate with the diagnostic analyzer server via a separate secure connection over a packet-switched network. Interactive content execution devices may be configured to receive selections of diagnostic modules comprising interactive content resources, and then initiate execution of the diagnostic modules for a particular content receiver device. During the execution of the diagnostic modules, an interactive content execution device may transmit interactive content to and receive response data from the particular content receiver device. The content execution device may analyze the results/responses to the interactive content, evaluate and/or score the performance of the receiver, and then transmit the evaluation/score to the diagnostic analyzer server. The diagnostic analyzer server may analyze the evaluations/scores in real-time or near real-time and select additional diagnostic modules for the receiver. The additional diagnostic modules may be transmitted back to the content execution device, which may initiate the execution and transmit the additional interactive content to the content receiver devices.

Additional techniques described herein relate to the analyses and selection of additional diagnostic modules by the diagnostic analyzer device. In some cases, such selection may happen in real-time during a diagnostic session between a content executor and content receiver. As noted above, the diagnostic analyzer device may receive sets of evaluations/scores from a content execution device, based on the responses to the interactive content received from content receiver devices. In some embodiments, the diagnostic analyzer device may also retrieve/receive additional previously collected entity records associated with the recipient of the interactive content. The diagnostic analyzer device then may determine one or more subsequent diagnostic modules for particular recipients of the interactive content, based on the received performance measurements and the previously collected entity records associated with the particular interactive content recipient. The selection of subsequent diagnostic modules may include, for example, determining multiple possible diagnoses for particular interactive content recipients, ranking the multiple possible diagnoses for probability/likelihood, based on analytics data correlating probabilities of diagnoses to evaluation results/scores of a previously executed set of diagnostic modules. The determined probabilities may be based on predetermined statistical data and/or trained machine learning algorithms. After determining the highest probability diagnosis (or multiple high-probability diagnoses), the additional diagnostic modules may be selected based on analyses of a library of potential additional diagnostic modules, and calculations of the amounts of change to the diagnostic probabilities that are projected to result from the execution of the particular additional diagnostic modules. For instance, diagnostic modules that are projected to significantly change the diagnostic probabilities of one or more of the high-probability diagnoses may be selected over additional diagnostic modules that are projected to result in less or no change to the diagnostic probabilities. Finally, the may be subsequent diagnostic modules may be selected by and/or transmitted to the interactive content execution device, from the diagnostic analyzer device, to be executed and provided to the interactive content recipient.

Further embodiments may produce segmented outputs illustrating likelihood and/or probability for the presence or absence of specific expressions of relevant clinical disorders for the content recipient to be utilized as targets for intervention of accommodation. Further, expressions of behavioral disturbances not specifically associated with most probable diagnosis may be identified due to potential for interference in application of interventions and/or accommodations or due to the high probability of interference with examinees capacity for expected levels of functioning in relevant settings.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, clinician/teacher devices and patient/student devices in a clinical diagnosis or learning classification network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, clinician devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, or clinical diagnosis of students/patients, the content server 112 may include data stores of training materials, presentations, plans, syllabi, reviews, evaluations, interactive programs and simulations, course models, course outlines, assessments and diagnostic modules, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the contexts of professional training, education, and/or clinical diagnosis of students or patients, the user data server 114 may store and analyze each user's assessments completed or training materials viewed, presentations attended, courses or tests completed, the user's responses or other interactions, assessment or evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.). The user data server 114 may also store user patterns associated with body movements and/or facial expressions made during content delivery that may indicate emotions such as confidence, confusion, frustration, etc.

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

Pattern server 118 may include hardware and software components to initiate various functions related to pattern manipulation as well as interacting with other components within the content distribution network. The pattern server 118 can compare stored patterns to incoming patters and linked values to generate pattern values that are used to dictate certain workflows performed by the content management server 102. The pattern server 118 may also store the incoming patterns and linked values in appropriate data stores. Pattern server 118 comprises a pattern engine and associated functionality.

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
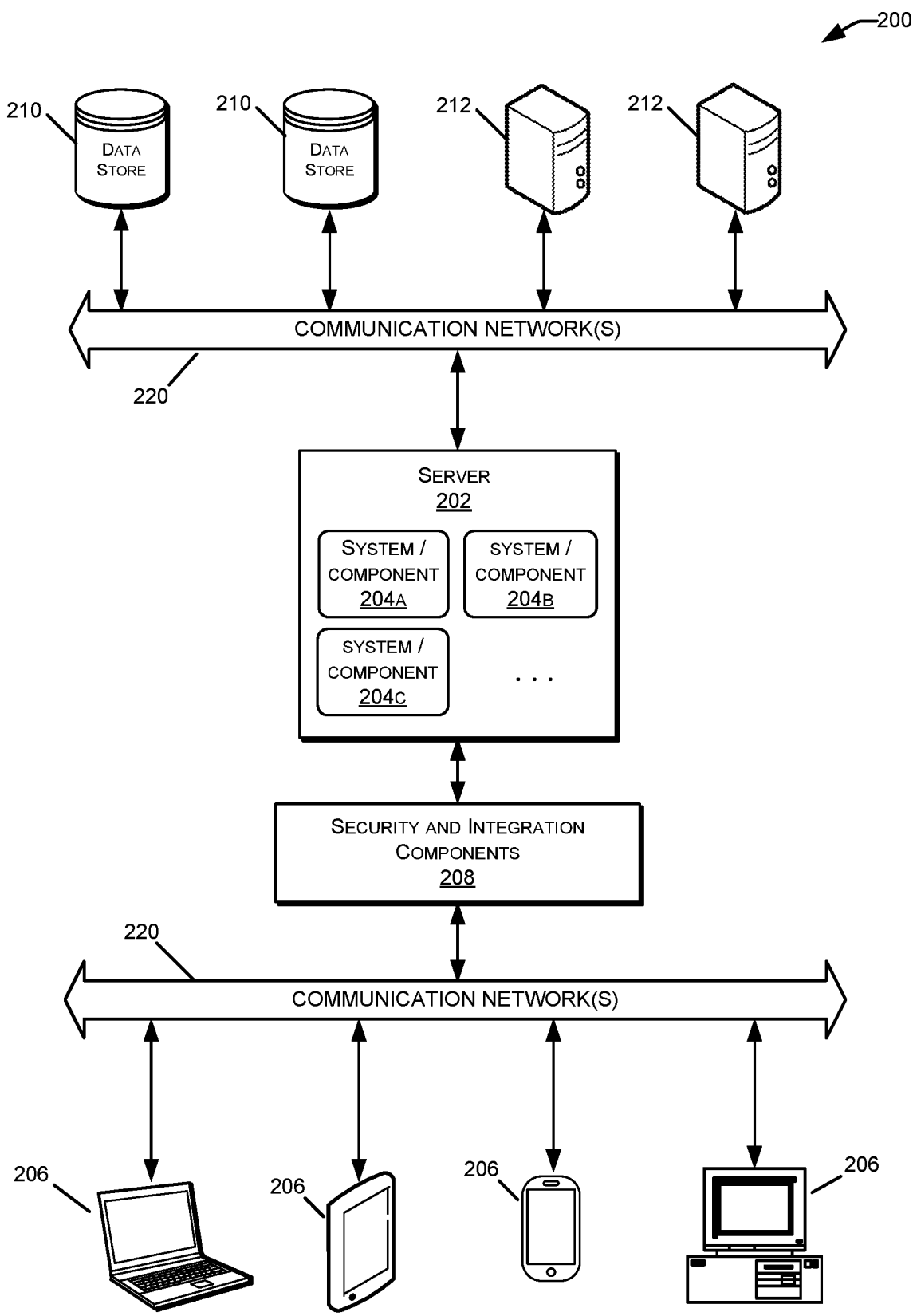
FIG. 2 is a block diagram illustrating a computer server and computing environment within a content distribution network, in accordance with one or more embodiments of the disclosure.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. As an example discussed in more detail below, certain client devices 206 having sufficient authorization credentials may be configured an interactive content execution device, which may be configured to initiate, monitor, and control the execution of interactive content resources via other client receiver devices 206. Server 202 (e.g., a diagnostic analyzer server) may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components.

The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML, encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
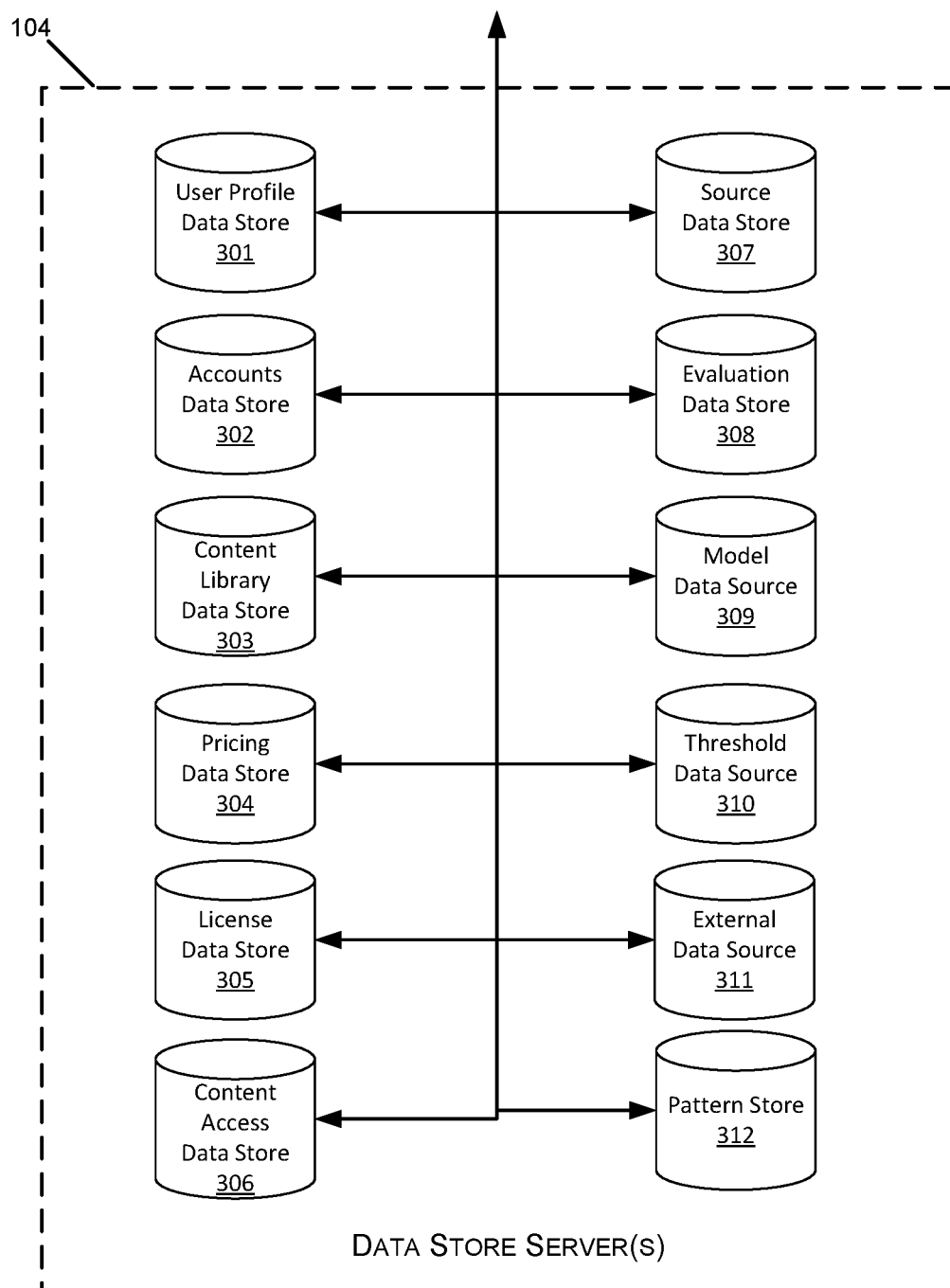
FIG. 3 is a block diagram illustrating an embodiment of one or more data store servers of a content distribution network, in accordance with one or more embodiments of the disclosure.

With reference to FIG. 3, an illustrative set of data stores and/or data store servers is shown, corresponding to the data store servers 104 of the content distribution network 100 discussed above in FIG. 1. One or more individual data stores 301-312 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-312, including their functionality and types of data stored therein, are illustrative and non-limiting. Data stores server architecture, design, and the execution of specific data stores 301-312 may depend on the context, size, and functional requirements of a content distribution network 100. For example, in content distribution systems 100 used for clinical diagnosis of examinees such as students and other patients, as well as distribution systems 100 for professional training and educational purposes, separate databases or file-based storage systems may be implemented in data store server(s) 104 to store student/patient assessment data, trainee data and/or student learning data, clinician, trainer and/or professor data, diagnostic module data (e.g., data defining which interactive content resources and versions are in which diagnostic modules), training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several clinicians, patients, students, teachers, administrators, or the like, and in some embodiments, this information can relate to one or several institutional end users such as, for example, one or several hospitals or clinics, schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are examinees (e.g., patients or students) of a diagnostic analysis, the user profile database 301 can further include information relating to these examinees' medical, behavioral, academic and/or educational history. This information can identify one or several courses of study or assessments that the examinee has previous initiated, completed, and/or partially completed, as well as grades/evaluations received in those courses of study or assessments. In some embodiments, the examinee's medical, behavioral, academic, and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several examinee/student learning preferences. In some embodiments, for example, the user, also referred to herein as the examinee (e.g., patient or student), or the student-user may have one or several preferred learning styles and/or assessment styles, one or several most effective learning styles, and/or the like. In some embodiments, the examinee's learning/assessment style can be any style describing how the examinee best learns or tests, or prefers to learn or test. In one embodiment, these styles can include, for example, identification of the examinee as an auditory learner, as a visual learner, and/or as a tactile learner. In some embodiments, the data identifying one or several examinee learning styles can include data identifying a learning style based on the examinee's educational history such as, for example, identifying a student as an auditory learner when the student has received significantly higher grades and/or scores on assessments or assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

In yet other embodiments the user profile data store 301 can include a user patterns store containing digitally captured facial expressions of the user. These patterns can be linked to pattern values that represent the sentiment expressed at the time of capture. For instance, a first pattern may be associated to a first value where the first value indicates the user was sad, happy, bored, confident, frustrated, angry, etc. These patterns and values can further be used to evaluate the user, the delivered content, the content provider, the content delivery method, etc. For instance, a value that indicates the examinee is bored could mean that the content in a diagnostic assessment is not being delivered at a high enough level, at too high of a level, is not interesting to the user, etc.

The user profile database 301 can further include information relating to one or several clinicians, teachers and/or instructors who are responsible for organizing, presenting, and/or managing the presentation of information to the student. In some embodiments, user profile database 301 can include information identifying courses and/or subjects that have been taught by a teacher (or assessments/modules given by a clinician), data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the clinician/teacher. In some embodiments, the user profile database 301 can further include information relating to improvement suggestions received by the clinician/teacher, training received by the clinician/teacher, continuing education received by the clinician/teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to form an object network. In some embodiments, these data packets can be linked in the object network according to one or several prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as, a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network also referred to herein as a content network or content aggregation network. The aggregation network can comprise a plurality of content aggregations that can be linked together by, for example: creation by common user (e.g., clinician, patient, student); relation to a common assessment, subject, topic, skill, or the like; creation from a common set of source material such as a diagnostic module or the like. In some embodiments, the content aggregation can comprise a grouping of content comprising the presentation portion of an assessment that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets they can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships embodied in the object network. In some embodiments, the content aggregation network, and/or the content aggregations forming the content aggregation network can be organized according to one or several tasks identified in the assessment (or assessment battery), syllabus, schedule or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources (e.g., assessments) may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students/patients, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like. Evaluation data store 308 also includes evaluations tabulated from pattern detection for content including instructional content and instructors.

A model data store 309, also referred to herein as a model database 309 can store information relating to one or several predictive models. In some embodiments, these can include one or several evidence models, risk models, skill models, or the like. In some embodiments, an evidence model can be a mathematically-based statistical model. The evidence model can be based on, for example, Item Response Theory (IRT), Bayesian Network (Bayes net), Logistic Regression, Discriminant Function Analysis, Principal Factor Analysis (PFA), linear and/or non-linear multiple regression models, multivariate base rate analysis, or the like. The evidence model can, in some embodiments, be customizable to a user and/or to one or several content items. Specifically, one or several inputs relating to the user and/or to one or several content items can be inserted into the evidence model. These inputs can include, for example, one or more measures of user skill level, one or more measures of content item difficulty and/or skill level, one or more measures of symptom severity/behavioral expression, one or more measures of functional interference, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a examinee receiving a particular classification or diagnosis, a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of an assessment or program such as, for example, a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the assessment/program. Specifically, in some embodiments, these completion status can be selected to all be at less than 60% completion of the assessment/program, and more specifically, in some embodiments, the first completion status can be at 20% completion of the assessment/program, the second completion status can be at 30% completion of the assessment/program, the third completion status can be at 40% completion of the assessment/program, and the fourth completion status can be at 50% completion of the assessment/program. Similarly, any desired number of model functions can be associated with any desired number of completion statuses.

In some embodiments, a model function can be selected from the plurality of model functions based on a user's progress through an assessment/program. In some embodiments, the user's progress can be compared to one or several status trigger thresholds, each of which status trigger thresholds can be associated with one or more of the model functions. If one of the status triggers is triggered by the user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program (or assessment) status parameters. In some embodiments, each of the model functions can use the same program status parameters, and in some embodiments, the model functions can use different assessment/program status parameters. In some embodiments, the model functions use different assessment/program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

A threshold database 310, also referred to herein as a threshold database, can store one or several threshold values. These one or several threshold values can delineate between states or conditions. In one exemplary embodiments, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education related data, consumer sales data, health related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

A pattern store 312 is a database containing patterns with linked values. The patterns represent digitized facial expressions of a multitude of people and the linked values are the sentiments corresponding to the facial expression at the time the digital pattern was captured. In some cases sentiment values can be averaged over the multitude of patterns with the same sentiment value and or remain searchable for each pattern and linked value. This is thus a generic pattern database since the patterns and linked values are not associated with a particular user of the content distribution network 100, although it could be comprised of patterns and values of all or a portion of the users of the content distribution network 100.

Figure 4:
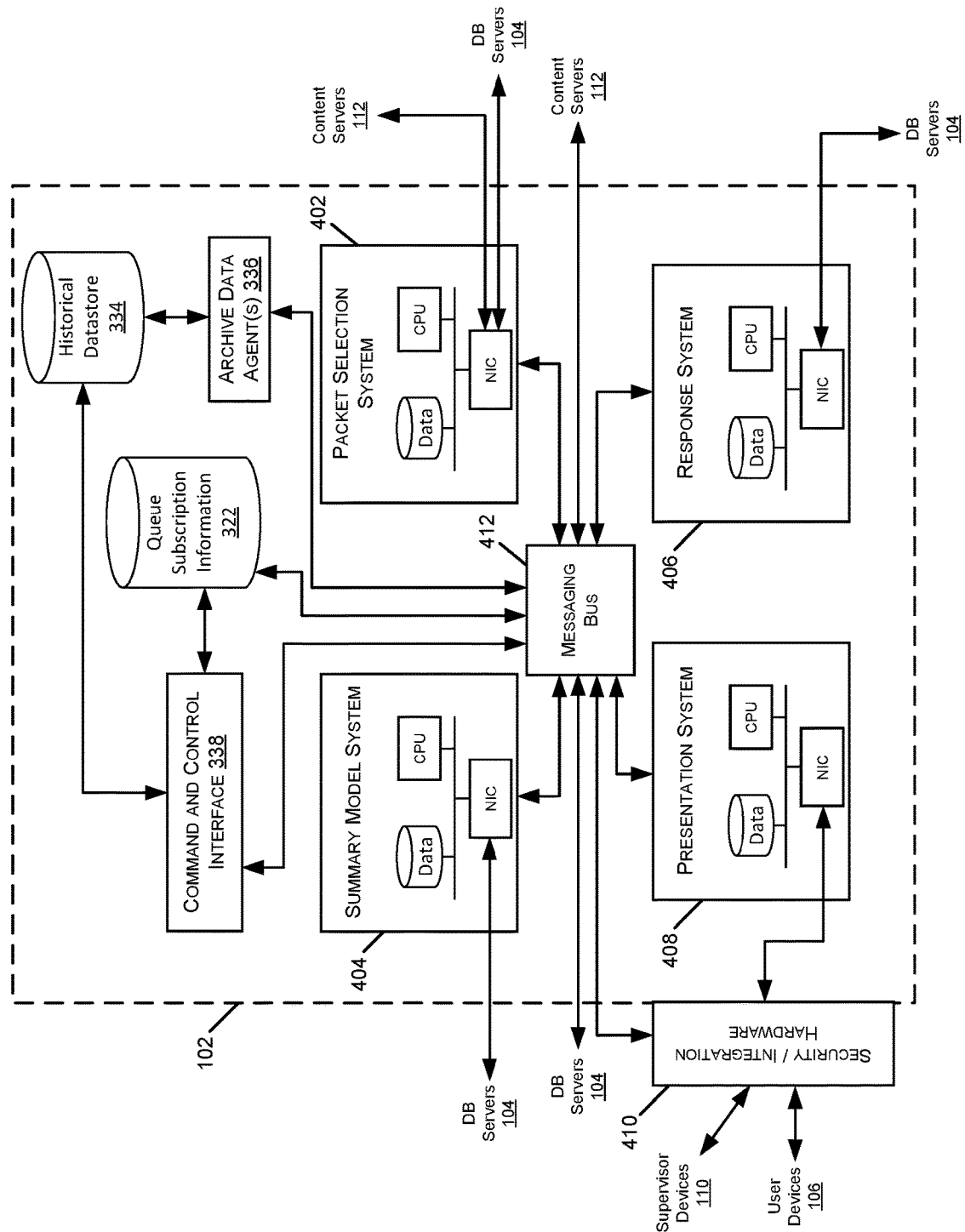
FIG. 4 is a block diagram illustrating an embodiment of one or more content management servers within a content distribution network, in accordance with one or more embodiments of the disclosure.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content (e.g., clinical assessments) provided to users; content consumed by users; responses provided by users (e.g., clinicians/students/patients); user skill levels; content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can opt to allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 238 various data streams can be selected for archiving into the historical data store 334.

Components of the content distribution network 100 outside of the server 102 can also gather information that is reported to the server 102 in real-time, near real-time or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response but define an identifier of that user as a private variable that would not be passed to processing subscribers lacking access to that user and/or authorization to receive that user data. Processing subscribers having access to that user and/or authorization to receive that user data would receive the subscriber identifier along with response reported that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. Specifically, in some embodiments, the messaging bus 412 can receive and output information from at least one of the packet selection system, the presentation system, the response system, and the summary model system. In some embodiments, this information can be output according to a "push" model, and in some embodiments, this information can be output according to a "pull" model.

As indicated in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distributed streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of messages in a particular category. For example, a data stream can comprise all of the data reported to the messaging bus 412 by a designated set of components. One or more processing subscribers may subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users, and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regards to the components 402-48, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content (e.g., particular interactive content within clinical assessments and/or diagnostic modules), also referred to herein as data packets, for providing to a user. These data packets can be selected based on, for example, the information retrieved from the database server 104 including, for example, the user profile database 301, the content library database 303, the model database 309, or the like. In some embodiments, these one or several data packets can be adaptively selected and/or selected according to one or several selection rules. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can identify one or several potential data packets for providing and/or one or several data packets for providing to the user based on, for example, one or several rules, models, predictions, or the like. The recommendation engine can use the skill level of the user to generate a prediction of the likelihood of one or several users providing a desired response to some or all of the potential data packets. In some embodiments, the recommendation engine can pair one or several data packets with selection criteria that may be used to determine which packet should be delivered to a user based on one or several received responses from that user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses or curriculums in clinical diagnoses, training or educational contexts, interactive gaming environments, and the like. For example, the summary model system 404 may query one or more databases and/or data store servers 104 to retrieve user data such as associated content compilations (e.g., diagnostic modules), content programs (e.g., assessments), content completion status, user goals, results, and the like.

A content management server 102 also may include an response system 406, which can include, in some embodiments, a response processor. The response system 406 may be implemented using dedicated hardware within the content distribution network 100 (e.g., a response server 406), or using designated hardware and software resources within a shared content management server 102. The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100. The response system 406 also may receive and analyze user evaluation data from user devices 106—including patterns associated with facial expressions, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, examinee evaluation scores, clinician/teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several response into one or several observables can include determining whether the one or several response are correct responses, also referred to herein as desired responses, or are incorrect responses, also referred to herein as undesired responses. In some embodiments, the translation of the one or several response into one or several observables can include characterizing the degree to which one or several response are desired responses and/or undesired responses. In some embodiments, one or several values can be generated by the response system 406 to reflect user performance in responding to the one or several data packets. In some embodiments, these one or several values can comprise one or several scores for one or several responses and/or data packets. In other embodiments, the response system 406 can be configured to receive one or more patterns from the user device 106 corresponding with digitized facial expressions made by the user of the user device 106 during delivery of the content. The response system 406 can match sentiment values to workflows and initiate the workflows according to values computed from the patterns received from user devices 106.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
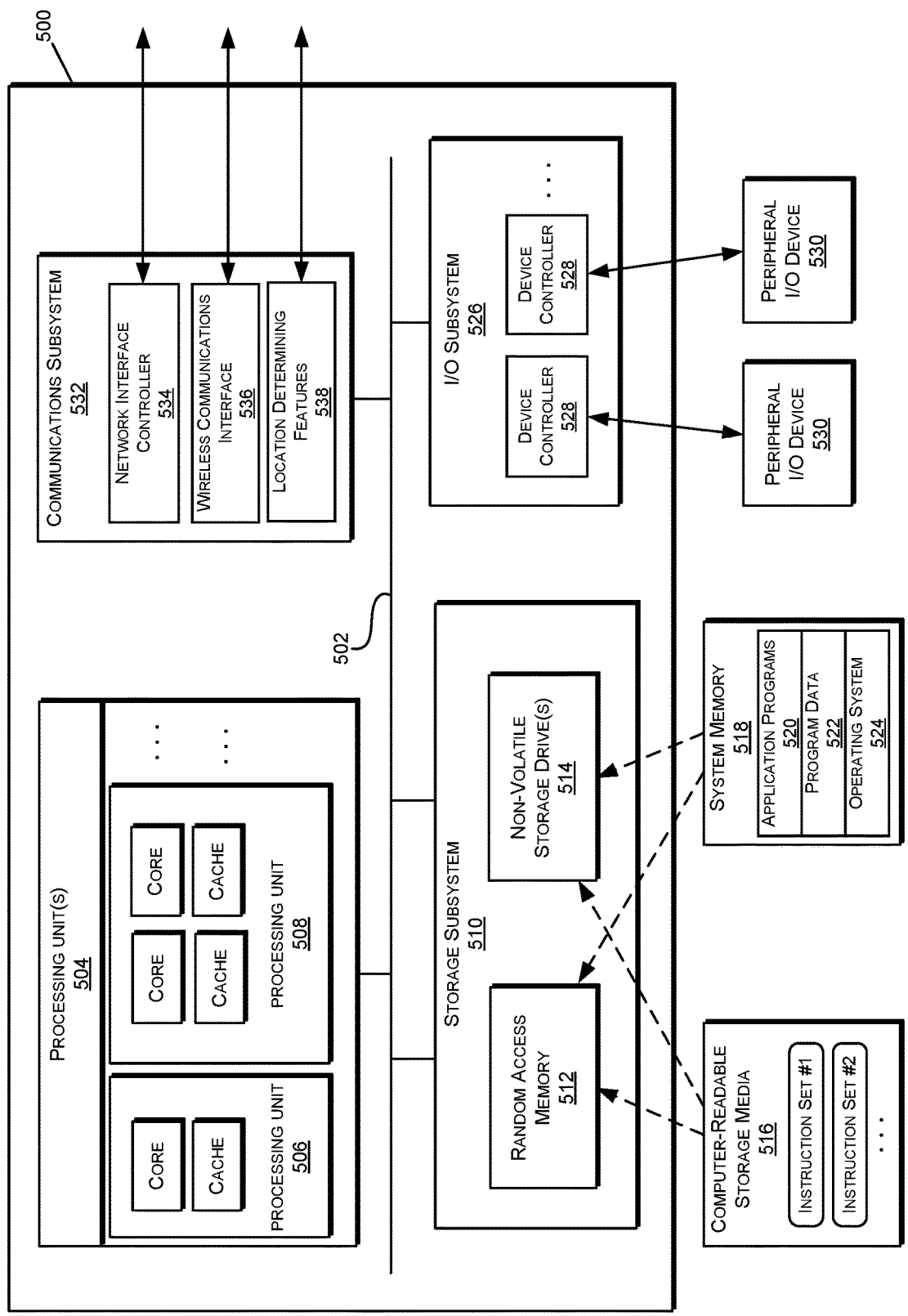
FIG. 5 is a block diagram illustrating the physical and logical components of a special-purpose computer device within a content distribution network, in accordance with one or more embodiments of the disclosure.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106 (e.g., an interactive content receiver device and/or an interactive content execution device), the supervisor device 110 (e.g., an interactive content execution device), and/or any of the servers 102, 104, 108, 112, 114, 116 (e.g., a diagnostic analyzer server). In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras or other image sensors, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 311). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, interactive assessment monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
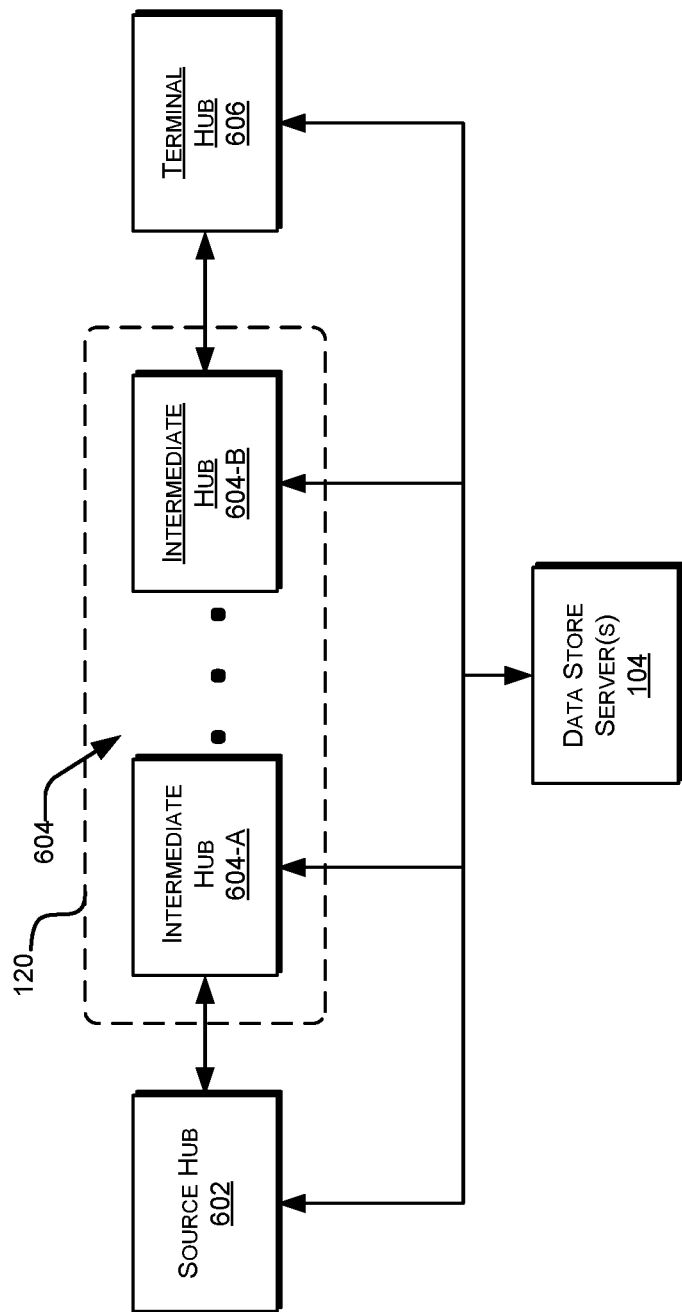
FIG. 6 is a block diagram illustrating a communication network in accordance with one or more embodiments of the disclosure.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatively connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
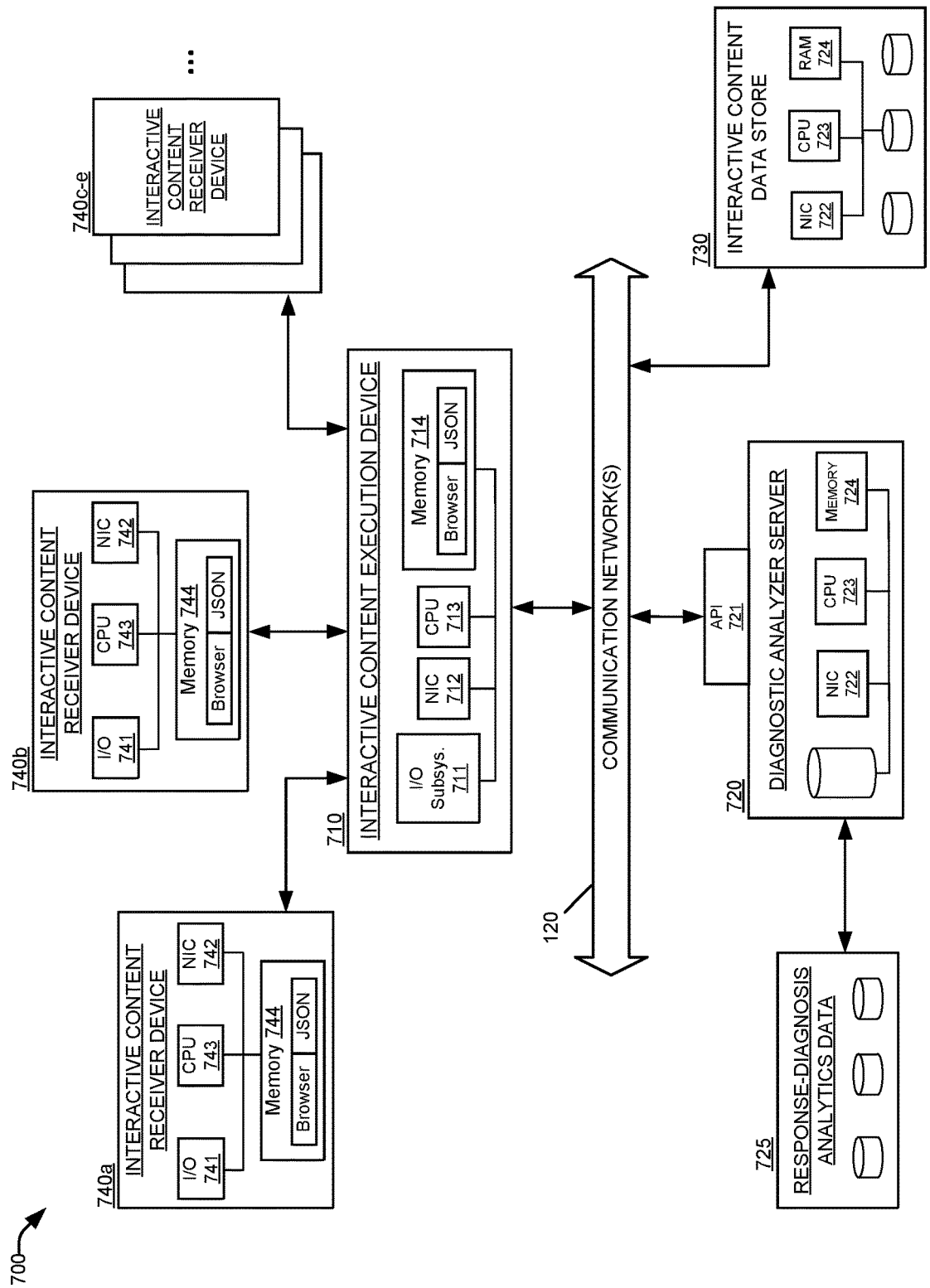
FIG. 7 is a block diagram illustrating an example diagnostic analysis and selection system for interactive content resources, according to one or more embodiments of the disclosure.

With reference now to FIG. 7, a block diagram is shown illustrating an example of a diagnostic and content selection system 700 for interactive content resources. As shown in this example, a diagnostic and content selection system 700 may include an interactive content execution device (or execution device) 710, one or more interactive content receiver devices (or receiver devices) 740, one or more (or execution client devices) 710, and a diagnostic analyzer server 720. As discussed below, diagnostic analyzer server 720 may be configured to analyze execution data from the execution of interactive content resources on various receiver client devices 740, which may be received via the intermediary execution device 710, to determine potential diagnoses, probabilities of diagnoses, and then to select subsequent interactive content resources for execution on particular receiver devices 740 via the execution device 710. Similarly, the execution device 710 and receiver devices 740 may operate in conjunction with one another, and/or with the diagnostic analyzer server 720 and content resource data stores 730 to receive and execute interactive content resources for users operating the receiver devices 740. As discussed below, the execution of content resources may be initiated by a first user (e.g., clinician, teacher, doctor, or other administrator) operating the execution device 710, but may cause the interactive content (e.g., assessment items such as questions and other interactive media) to be output to a second user operating a receiver device 740. Additionally, during execution of the content resources, the second users operating the receiver devices 740 may interact with the content by providing response (e.g., answers to questions) and/or any other feedback, which is transmitted back to the execution device 710. Such feedback may be provided and transmitted during or after execution of the content resources, and the execution device 710 may monitor and control the execution of the content resources that are provided to receiver devices 740. Thus, for example, a clinician operating an execution device 710 may select which interactive content from an assessment or diagnostic module will be transmitted and rendered on the receiver device 740, also may choose to execute interactive content resources non-linearly (e.g., skipping between questions or subtests, restarting, etc.), and may choose to terminate early an execution of a content resource. As discussed above, various types of interactive content resources may be analyzed, selected, and executed within the diagnostic and content selection system 700 and other related systems described herein. For example, the interactive content resources may include diagnostic software modules having one or more clinical assessments organized into tests and subtests. Additional examples of interactive content resources may include audio/video media resources, gaming software resources, eCommerce related resources, professional training and educational resources, assessments, etc.

As noted above, in some embodiments the content resources transmitted to and executed by content execution devices 710 and content receiver devices 740, as well as the content resources analyzed and selected by the diagnostic analyzer server 720 for particular content receivers/executors may be diagnostic modules corresponding to assessment resources (or assessments). As used herein, diagnostic modules (or assessments) may refer to interactive software and/or media packages configured for execution on one or more client devices 710 and/or 740. In various examples, assessments may be used to perform medical, behavioral and/or educational evaluations of particular individuals. For instance, an assessment may be requested and received at an execution client device 710 by an authorized content executor, such as a specialized clinician or educator. Specific assessments may be designed to be administered only by specifically qualified content executors, such as school psychologists, special needs educators, clinical psychologists, speech pathologists, and the like. Specific assessments also may be designed to be administered to specific recipients or end users, such as particular patients or students within a predetermined age range or developmental level, or particular end users having a predetermined diagnosed condition, etc. As illustrated in FIG. 7, the recipients or end users may operate the receiver devices 740 during execution of the assessments, during which the recipients may receive and respond to the interactive assessment content transmitted from the execution device 710 at the direction of the content executor. For instance, an authorized clinician may initiate execution of an assessment on an execution device 710 which is connected to a receiver device 740 (e.g., paired-with via Bluetooth or other short-range wireless protocol) operated by the particular patient or student being evaluated. During the execution, the clinician may monitor and control the navigation of the assessment, controlling what content is transmitted to and output on the receiver device 740, and reviewing in real-time the user's responses to the content.

As data objects, diagnostic modules or assessments may correspond to individual and standalone content resources, or may correspond to groups of related resources. For instance, an assessment may refer to a group of related interactive content resources, each of which is a component or subtest of the assessment. In some cases, an assessment consisting of multiple components may be provided to execution devices 710 and/or receiver devices 740 as a single content resource, while in other cases client devices 710 and 740 may request/receive the individual content components of an assessment as separate content resources rather than requesting/receiving the entire assessment. Additionally, particular content executors (e.g., clinicians, therapists, etc.) may have licenses and/or subscriptions for individual assessments (each of which having one or more components) and/or for groups or packages of related assessments. As discussed below, the selections and recommendations of particular assessments (and/or particular components within assessments) provided to content executors may be based in part on whether the selected assessments are covered by the existing licenses or subscriptions of the content executor.

Further, assessments and/or individual content components within assessments may have various execution restrictions and requirements based on the execution device 710 or the content executor operating the execution device 710. Similarly, execution restrictions and requirements also may be based on the particular receiver device 740 and/or the end user recipient operating the receiver device 740 to receive and to respond to the assessment. For examples, certain assessments may have particular hardware and/or network requirements, and thus may be prevented from being selected for execution by a content executor or downloaded or executed by an execution device 710 not meeting those hardware and/or network requirements. Similarly, if the particular receiver device 740 does not satisfy the hardware requirements (e.g., minimum processor or memory capacity, I/O or graphics capabilities such as sound, touch screen, movement sensors, GPS, 3D capabilities, etc.), then the execution of the assessment on the execution device 710 may be prohibited when the execution device 710 is connected to the particular receiver device 740. Similarly, for network requirements, the diagnostic analyzer server 720 and/or the execution device 710 may prevent an assessment from being selected for and/or transmitted to the execution device 710, or from being executed on the execution device 710, if and when the current network conditions (e.g., current bandwidth, congestion levels, etc.) of the connection between the execution device 710 and receiver device 740 do not satisfy the network requirements, and/or when the current connection of the execution client device 710 to its access network (e.g., an LTE network or a 2G, 3G, or 5G, etc. wireless network) does not satisfy the network requirements associated with the assessment. Further, in some embodiments, neither an Internet connection nor any access network need be available to perform the execution, evaluation, and selection of test content. For example, as discussed below, the analyzer server 720 may be optional in some embodiments, where all analyses and selection processes/algorithms are performed by the execution device 710 or directing by the receiver device 740. Additionally, the communication between the execution device 710 and the one or more receiver devices 740 need not require any network, but may be performed entirely via Bluetooth or other short-range connection.

Additional requirements associated with an assessment may relate to the individual content executor. For example, the diagnostic analyzer server 720 may prevent a particular assessment from being selected for, transmitted to, or executed by an execution device 710 unless the content executor (e.g., clinician, medial professional, educator, etc.) initiating and controlling the assessment has a required authorization level. Such authorization levels may correspond to the access permissions of a particular content executor (e.g., determined based on their login credentials) on any of the servers or devices in the system 700. The authorization level of the content executor also may correspond to the professional qualifications of the content executor, such as professional credentials, degrees, certifications, and/or licenses of the particular clinician, educator, etc. Thus, certain assessments may be authorized to be selected for, transmitted to, and/or executed on execution devices 710 by content executors having certain access permissions within the system 700 and/or having certain professional qualifications, while the same assessments may be restricted from other content executors not having the required access permissions and/or professional qualifications. Other types of assessment restrictions may be based on characteristics of the end user (e.g., patient or student) operating the receiver device 740. For example, the diagnostic analyzer server 720 and/or the execution device 710 may enforce restrictions that ensure that the examinee taking the assessment, such as a patient or student must be within a predetermined age range or developmental level, or must have a particular predetermined diagnosed condition, etc.

Additionally or alternatively, the assessment requirements for content executors may be based on the organization of the content executor. That is, certain assessments may be authorized to be selected for, transmitted to, and/or executed by content executors associated with certain organizations but not others. Additional assessment requirements for content executors may be location based, so that only content executors currently within a particular geographic jurisdiction (e.g., one or more specific countries, states, counties, etc.), or at particular locations (e.g., specific hospitals, schools, medical offices, etc.), may be authorized for certain assessments. Similar location-based assessment requirements may be enforced based on the location of the receiver device 740 in addition to, or instead of, the location of the execution device (e.g., in situations when the content executor and content recipient are not at the same physical location). Further examples of the assessment requirements may include limitations on the number and/or frequency of executions of an assessment by a particular content executor or to a particular content recipient, and restrictions on the times and days that an assessment may be executed by a particular content executor and/or to a particular content recipient.

Any of the above requirements associated with an assessment (and/or with individual components within assessments) may be implemented within and enforced by the diagnostic and content selection system 700 using various techniques. As discussed below system 700 may be an implementation of a content distribution network 100 in which execution devices 710 are able to request, receive, and execute interactive content resources from one or more content data stores 730, either directly or through the diagnostic analyzer server 720). Thus, any of the various types of assessment restrictions discussed above may be enforced by execution devices 710 and/or content data stores 730 whenever a content executor attempts to download and/or initiate execution of an assessment on an execution device 710. Additionally, as discussed below, the diagnostic analyzer server 720 may be configured to analyze assessment results and additional data, in order to select and recommend subsequent assessments of interactive content resources for particular content recipients based on the analysis. Therefore, any of the various types of assessment restrictions discussed above may be enforced by the diagnostic analyzer server 720, by selecting (or not selecting) interactive content resources for a particular content executor based on determinations that the content executor, the execution device 710, the content recipient, or the receiver device 740 is (or is not) authorized for the interactive content resources. In such embodiments, the diagnostic analyzer server 720 may filter the interactive content resources selected for and/or output to the execution device 710, to include only those interactive content resources that are authorized for execution by the content executor (and/or the executor's organization), on the execution device 710, to the content recipient, on the recipient device 740, and at the current time, current execution location, etc.

In some embodiments, the diagnostic and content selection system 700 may be integrated within, or configured to operate in collaboration with, one or more content distribution networks 100. For example, system 700 may be the same as, or may operate within or in collaboration with, any of the content distribution network (CDNs) 100 described above. Thus, specific examples of diagnostic and content selection systems 700 may include, without limitation, educational and professional training systems and networks, interactive gaming systems and networks, clinical/educational assessment distribution systems and networks, and enterprise application systems and networks, websites and other Internet-based systems and networks. Accordingly, in the various different diagnostic and content selection systems 700, content resources may correspond to assessments and/or assessment components or packages (e.g., diagnostic modules), while in other systems 700 the resources may correspond to educational/training resources (e.g., in educational and professional training CDNs 100), evaluation or survey resources (e.g., in enterprise applications or online Internet-based CDNs 100), or product/media resources (e.g., in interactive gaming or media distribution CDNs 100), etc.

In some cases, the diagnostic analyzer server 720 may be implemented within one or more content management servers 102 and/or other CDN servers, the content resource data store(s) 730 may correspond to one or more content servers 112 and/or data store servers 104, and both the content execution devices 710 and/or the content receiver devices 740 may correspond to the user devices 106 and 110 described above in reference to CDN 100. Thus, within the diagnostic and content selection system 700 (which may also be referred to as CDN 700 when describing certain embodiments), execution devices 710 and/or receiver devices 740 may interact with the diagnostic analyzer server 720 to upload content execution data and receive selections and/or recommendations of additional content resources (e.g., assessments) to be executed. As discussed below, the diagnostic analyzer server 720 may maintain execute various algorithms and subsystems, and may use various response-diagnosis analytics data stores 725 storing content resource execution data and/or association data between content resources and potential diagnoses. Additionally, execution devices 710 may interact with content resource data stores 730, directly or indirectly, to request/receive particular interactive content resources (e.g., assessments) based on the selections determined and provided by the diagnostic analyzer server 720. Although the diagnostic analyzer server 720, analytics data store 725, and content resource data store 730 are shown as separate components in this example, in other embodiments they may be implemented within the same servers and/or same data centers. In other examples, a diagnostic analyzer server 720 may be implemented using one or more computer servers, and other specialized hardware and software components, separately from any other CDN components such as content servers 112, content management servers 102, data store servers 104, and the like. In these examples, the diagnostic analyzer server 720 may be configured to communicate directly with execution devices 710 and/or directly with receiver devices 740, or may communicate indirectly through content management servers 102 and/or other components and communications networks of the CDN 700.

In order to perform these features and other functionality described herein, each of the components and sub-components discussed in the example diagnostic and content selection system 700 for interactive content resources may correspond to a single computer server or a complex computing system including a combination of computing devices, storage devices, network components, etc. Each of these components and their respective subcomponents may be implemented in hardware, software, or a combination thereof. Certain execution devices 710 may communicate directly with the diagnostic analyzer server 720, while other execution devices 710 may communicate with the diagnostic analyzer server 720 indirectly via one or more intermediary network components (e.g., routers, gateways, firewalls, etc.) or other devices (e.g., content management servers 102, content servers 112, etc.). Although the physical network components have not been shown in this example so as not to obscure the other elements depicted in the figure, it should be understood that any of the network hardware components and network architecture designs may be implemented in various embodiments to support communication between the servers and devices in the system 700. Additionally, different execution devices 710 may use different networks and networks types to communicate with the diagnostic analyzer server 720 and/or the receiver device 740, including one or more telecommunications networks, cable networks, satellite networks, cellular networks and other wireless networks, and computer-based IP networks, and the like. Further, certain components within system 700 may include special purpose hardware devices and/or special purpose software, such as those included in I/O subsystems 711 and 741, and client application memory 714 and 744 of the execution devices 710 and receiver device 740, as well as those within the API 721 and processing engines within the memory 724 of the diagnostic analyzer server 720, discussed below.

Although the functionality of system 700 may be described below in terms of a client-server model, it should be understood that other computing environments and various combinations of servers and devices may be used to perform the functionality described herein in other examples. For instance, certain analyses of content resource executions may be performed on execution devices 710 and/or receiver devices 740, while determinations of correlations between assessment performance and diagnoses, and the selections of additional content resources for particular content recipients may be performed by a web-based server (e.g., diagnostic analyzer server 720) in collaboration with a client application (e.g., web browser or standalone client application) executing on execution devices 710. In other cases these techniques may be performed entirely by a specialized diagnostic analyzer server 720, or entirely by software executing on an execution device 710. In other examples, a client-server model may be used as shown in system 700, but different functional components and processing tasks may be allocated to the client-side or the sever-side in different embodiments. Additionally, the content resource data store 730 and analytics data store 725 may be implemented as separate servers or storage systems in some cases, and may use independent hardware and software service components.

Interactive content execution devices 710 and/or receiver devices 740 may include desktop or laptop computers, smartphones, tablet computers, and other various types of computing devices, each of which may include some or all of the hardware, software, and networking components discussed above. Specifically, an execution device 710 and/or receiver device 740 may be any computing device with sufficient processing components, memory and software components, and I/O system components for interacting with users (e.g., content executors and content recipients), and supporting communication with the diagnostic analyzer server 720 and content resource data stores 730 to select and receive assessments (or other resources) for execution. Accordingly, execution devices 710 and receiver devices 740 may include the necessary hardware and software components to establish the network connections with each other (e.g., during an execution/assessment session) and with the other devices/servers in the system 700, as well as the security and authentication capabilities, and capabilities for assessment resource storage, validation, execution, and responses/feedback. In this example, execution devices 710 and receiver devices 740 may each include an I/O subsystem 711 and 741 for interacting with their respective users (e.g., content executors and content recipients). Devices 710 and 740 also may have network interface controllers 712 and 742, processing units 713 and 743, memory 714 and 744 configured to operate their respective client software applications. Execution devices 710 and receiver devices 740 both may be configured to receive and execute various programmatic and graphical interfaces to receive, store, and execute assessment resources having various types of assessment components and functionality. Accordingly, each I/O subsystem 711 and 741 may include hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different execution devices 710 and/or receiver devices 740 may support different input and output capabilities within their I/O subsystems 711 and 741, and thus different types of interactions with assessments/components may be compatible or incompatible with certain devices 710 or 740. For example, certain interactive assessments (or other types of content resources) may require specific types of processors, graphics components, network components, or I/O components in order to be optimally executed via an execution device 710 and/or output via a receiver device 740. In some embodiments, users may establish user-specific preferences for executing specific types of assessments or other resources on specific types of devices 710 and 740. Additionally, as shown in this example, the memory 714 and 744 of devices 710 and 740 may include web browser software having browser-native support for JavaScript Object Notation (JSON). In some embodiments, JSON data objects may be generated and stored within the browser memory of execution devices 710 and/or receiver devices 740, and may be used to implement the user interactions and feedback logic for assessments and/or other types of interactive content resources.

In some embodiments, the diagnostic analyzer server 720 may generate and provide the software interfaces (e.g., via API 721, a web-based application or other programmatic or graphical interface techniques) used by the execution devices 710 to request/receive content resources, and to provide selections of additional content resources to the execution devices 710. For example, in response to receiving and validating login credentials from an execution device 710, or at predetermined times before logins are received, the diagnostic analyzer server 720 may access the response-diagnoses correlations and analytics data stores 725 to retrieve and analyze assessment execution data, and determine an initial battery of assessments for the content executor operating the execution device 710. Then, after receiving and analyzing the results of the initial battery of assessments, the diagnostic analyzer server 720 may select additional assessments based on content recipient data, the results of the initial assessments, and/or additional data. In other to perform the tasks described herein, diagnostic analyzer server 720 and/or data stores 725-730 may include components such as network interface controllers 722, processing units 723, and memory 724 configured to store server software, handle authentication and security, and store/retrieve assessments and other content resources from data stores 730, etc. The diagnostic analyzer server 720 and data stores 725-730 may be implemented as separate software (and/or storage) components within a single computer server in some examples, while in other examples may be implemented as separate computer servers/systems having separate dedicated processing units, storage devices, and/or network components.

Figure 8:
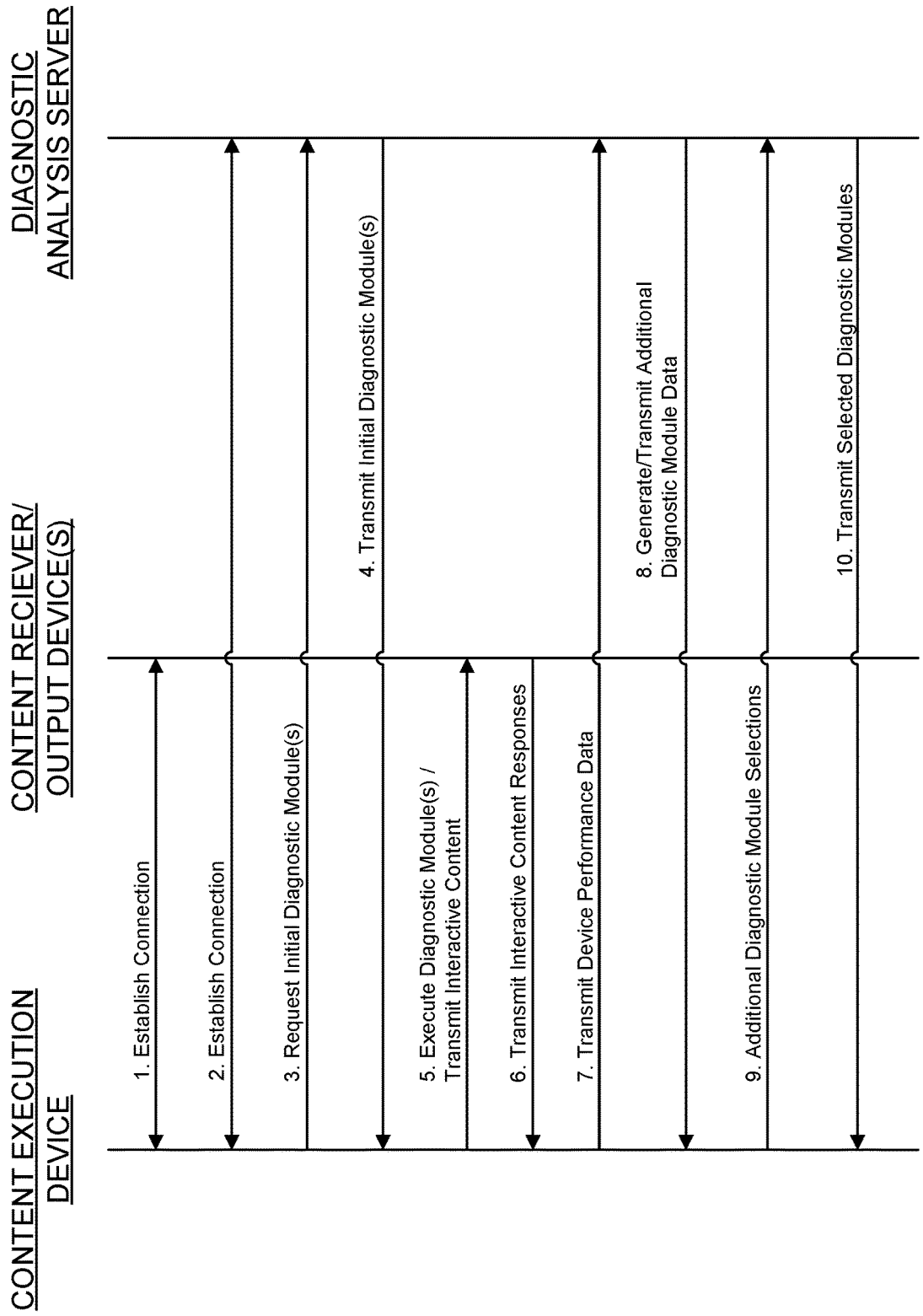
FIG. 8 is a swim lane diagram illustrating an example process of executing, analyzing, and selecting diagnostic modules including interactive content resources, for a particular content receiver, according to one or more embodiments of the disclosure.

Referring now to FIG. 8, a swim lane diagram is shown illustrating certain techniques for retrieving and executing content resources using one or more interactive content receiver devices 740 connected to an interactive content execution device 710 and/or a diagnostic analyzer server 720. The steps in this example, labeled as numbers (1-8) may correspond to steps performed by a receiver device, execution device 710, and/or diagnostic analyzer server 720, and more specifically may represent transmissions that may occur between devices during the execution and evaluation of interactive content resources, and the diagnostic analyses and subsequent selection of additional content resources based on the analyses.

Step 1 represents the establishment of a connection between the content execution device 710 and one or more receiver devices 740. As noted above, in some cases, the content executor operating the execution device 710 may be at the same physical location as the content recipient operating a receiver device 740. In such cases, the connection in step 1 may be implemented using a short-range wireless connection, for example, pairing the devices 710 and 740 using Bluetooth. Additionally, the use of encryption and/or other secure protocols might not be required in some cases when the execution device 710 and receiver device 740 are in the same physical location, and using short-range wireless transmissions to communicate, even when transmitted secure and confidential data, since the risk of the data being intercepted or comprised may be minimal. In step 2, a connection is established between the content execution device 710 and the diagnostic analyzer server 720. In contrast to step 1, the connection in step 2 may be established over multiple public and/or unsecure networks (e.g., the Internet, local access networks, and other IP or packet-switching networks, etc.). Thus, communication sessions between the execution device 710 and the diagnostic analyzer server 720 may be established in step 2 using various secure protocols and/or encryption techniques to protect the confidential data that may be transmitted, such as confidential patient or student records, medical history data, assessment results, financial or demographic information of users, etc. Additionally, the connection of step 2 may be established before the connection of step 1 in some cases.

In step 3, to commence a resource execution session (e.g., a clinical diagnostic session) with the content recipient operating the receiver device 740, the context executor may first use the execution device 710 to request a set of initial diagnostic modules from the diagnostic analyzer server 720. As noted above, the diagnostic modules may include one or more interactive software resources corresponding to one or more assessments, including individual assessment components, assessments or tests/subtests, or batteries of related assessments. In step 4, the diagnostic analyzer server 720 may receive and respond to the request by transmitting the requested diagnostic modules to the execution device 710. Although in this example, the execution device 710 may request and receive resources at the direction of a content executor (e.g., clinician, teacher, administrator, etc.), in other examples the initial set of diagnostic modules may be selected and provided automatically by the execution device 710 and/or the diagnostic analyzer server 720, based on additional sources of data related to the content recipient. Additionally, although this example shows the execution device 710 receiving diagnostic modules from the diagnostic analyzer server 720, in other implementations the execution device 710 may retrieve diagnostic modules directly from a content resource data store 730. In certain cases, the diagnostic analyzer server 720 might provide a specific location (e.g., URL) or authorization code allowing the execution device 710 to retrieve the particular diagnostic modules from the content resource data store 730, while in other cases the execution device 710 may be authorized to retrieve any and all desired diagnostic modules directly from the content resource data store 730 without needing any assistance or authorization from the diagnostic analyzer server 720.

In step 5, after execution device 710 receives the initial set of diagnostic modules, the context executor may initiate the execution of the diagnostic modules on the execution device 710. Based on the Bluetooth pairing or other network connection established between the execution device 710 and the receiver device 740, along with the corresponding communications between the active client applications running on the execution device 710 and the receiver device 740, the execution of the diagnostic modules on the execution device 710 may cause the individual interactive assessment components (e.g., clinical assessment questions or other diagnostic/assessment content) to be transmitted to and rendered on the receiver device 740. In step 6, the responses and/or feedback from the content recipient operating the receiver device 740 may be collected by the receiver device 740 and transmitted back to the execution device 710 via the connection.

In step 7, the execution device 710 may measure the recipient performance on the initial set of diagnostic modules based on the responses/feedback data received in step 6, and may transmit the performance measurement data to the diagnostic analyzer server 720 for analysis. In some cases, performance measurements may correspond to scores or evaluations of assessment content resources, which may be performed automatically by the software of the execution device 710 and/or by the individual content executor. In some embodiments, additional context data collected from the receiver device 740 and/or the execution device 710 relating to the content recipient, such as user response times to assessment content, facial expressions, behavioral or body language analysis data, and/or subjective observations of the context executor may be incorporated into the performance measurements of step 7. The execution device 710 may then transmit the performance measurements for the content recipient, as well as optional additional data related to the execution of the diagnostic modules (e.g., data identifying the content executor, specifications of the execution device 710 and/or receiver device 740, execution time or location, environmental conditions associated with the assessment such as movement, background noise, temperature, etc.), to the diagnostic analyzer server 720 for analysis.

In step 8, the diagnostic analyzer server 720 may generate selections of additional assessments/diagnostic modules to be executed within the diagnostic analysis of the content recipient, and may transmit the assessment/diagnostic module selections to the execution device 710. As discussed below in more detail in reference to FIG. 10, the selections of additional assessments/diagnostic modules for the content recipient may be determined based on various statistical data, analysis techniques, and algorithms, based on the performance measurement data received in step 7 as well as any additional data relating to the execution session received from the execution data and/or data relating to the content recipient received from additional data sources. As discussed below, the analyses performed in the diagnostic analyzer server 720 may include determining one or more potential diagnoses associated with the content recipient, as well as probabilities associated with each of the potential diagnoses. Additional diagnostic modules may be selected in response to determining that the assessment content within those diagnostic modules is likely to affect the probabilities (in either the positive or negative direction) of one or more of the potential diagnoses of the content recipient, thereby improving the efficiency and accuracy of the diagnostic analysis process.

In this example, step 8 may include transmitting only a listing (e.g., names and descriptions) of the selected diagnostic modules to the execution device 710 for display, so that in step 9 the context executor may request/retrieve one or more of the selected diagnostic modules to be used in the diagnostic assessment, and in step 10 the diagnostic analyzer server 720 may transmit only the particular diagnostic modules selected by the content executor to the execution device. However, in other examples, the diagnostic analyzer server 720 may directly initiate transmission of the diagnostic modules in step 8 (rather than only module data/listings), and thus steps 9-10 need not be performed in such cases.

After the completion of these steps, the content executor may initiate execution of any or all of the additional diagnostic modules received from the diagnostic analyzer server 720 (thus returning to step 5), to continue the ongoing diagnostic assessment of the content recipient operating the recipient device 740. Further, these steps may be performed in real-time or near real-time, allowing the diagnostic assessment to continue uninterrupted and without significant delay in performing evaluations/scoring, or for updating analyses of diagnostic determinations and probabilities used to select the additional assessments/modules. Additionally, the steps in this example may be similarly performed using different levels of assessment granularity and frequency for evaluating and updating the analysis. For example, in certain embodiments, the data transmitted in steps 5-10 may correspond to diagnostic modules containing entire assessments (e.g., tests or subtests). In other embodiments, each user response or feedback data, such as a response to a single question within an assessment, or any single item of user feedback data detected by the receiver device 740, may be transmitted back to the execution device 710 and may trigger updated analyses and an updated performing of steps 7-10, even while the execution of the same assessment continues on the execution device 710 and receiver device 740. The granularity of such embodiments may further improve the efficiency of the diagnostic analysis, and may be performed seamlessly via background processes which are transparent to the content recipient and/or the content executor.

Figure 9:
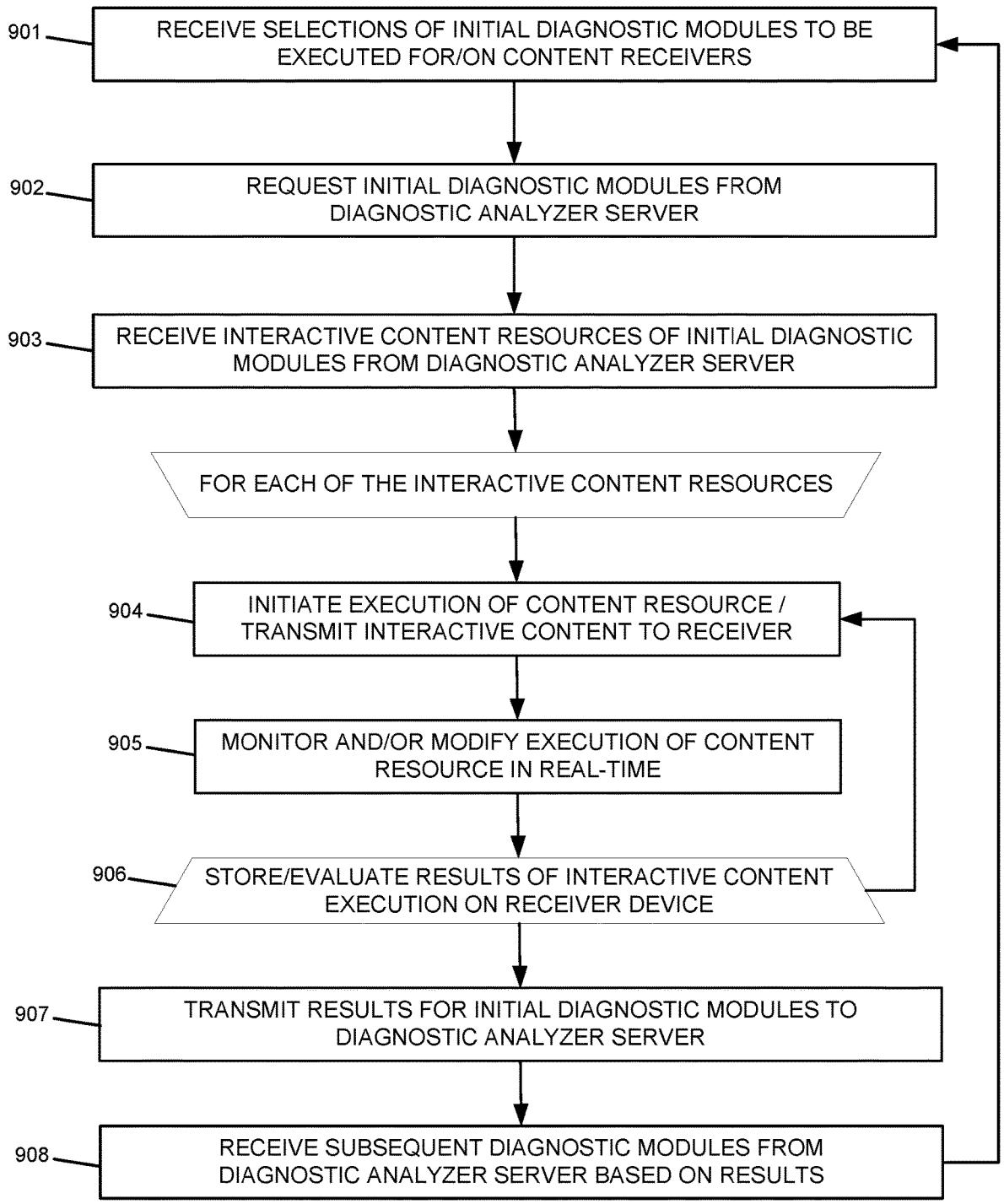
FIG. 9 is a flow diagram illustrating an example process of monitoring and evaluating content receivers, using diagnostic modules executed on a content execution device, according to one or more embodiments of the disclosure.

Referring now to FIG. 9, a flow diagram is shown illustrating a process of executing, monitoring, and evaluating diagnostic analysis of content recipients using content execution devices. As described below, the steps in this process may be performed by one or more components in the diagnostic and content selection system 700 described above. For example, each of the steps 901-908 may be performed by a content execution device 710 in communication with a diagnostic analyzer server 720 and/or one or more receiver devices 740. However, in other examples, one or more of steps 901-908 may be performed by or in conjunction with a diagnostic analyzer server 720 or receiver devices 740, using one or more data stores 725-730. It should also be understood that the various features and processes described herein, including executing diagnostic modules and transmitting assessment content to receiver devices 740, as well as receiving and evaluating the response/feedback data associated with the execution of the diagnostic modules, need not be limited to the specific systems and hardware implementations described above in FIGS. 1-7.

In step 901, an execution device 710 may receive a set of initial diagnostic modules that may be executed for a content recipient on one or more of the content receiver devices 740 associated with the execution device 710. The initial set of diagnostic modules may be provided automatically, for example, by the diagnostic analyzer server 720 in response to the establishment of a connection and the initiation of a clinical diagnosis session. In step 902, a content executor operating the execution device 710 (e.g., a clinician, teacher, administrator, etc.) may select one or more of the diagnostic modules to be executed during the clinical diagnosis session.

Figure 11:
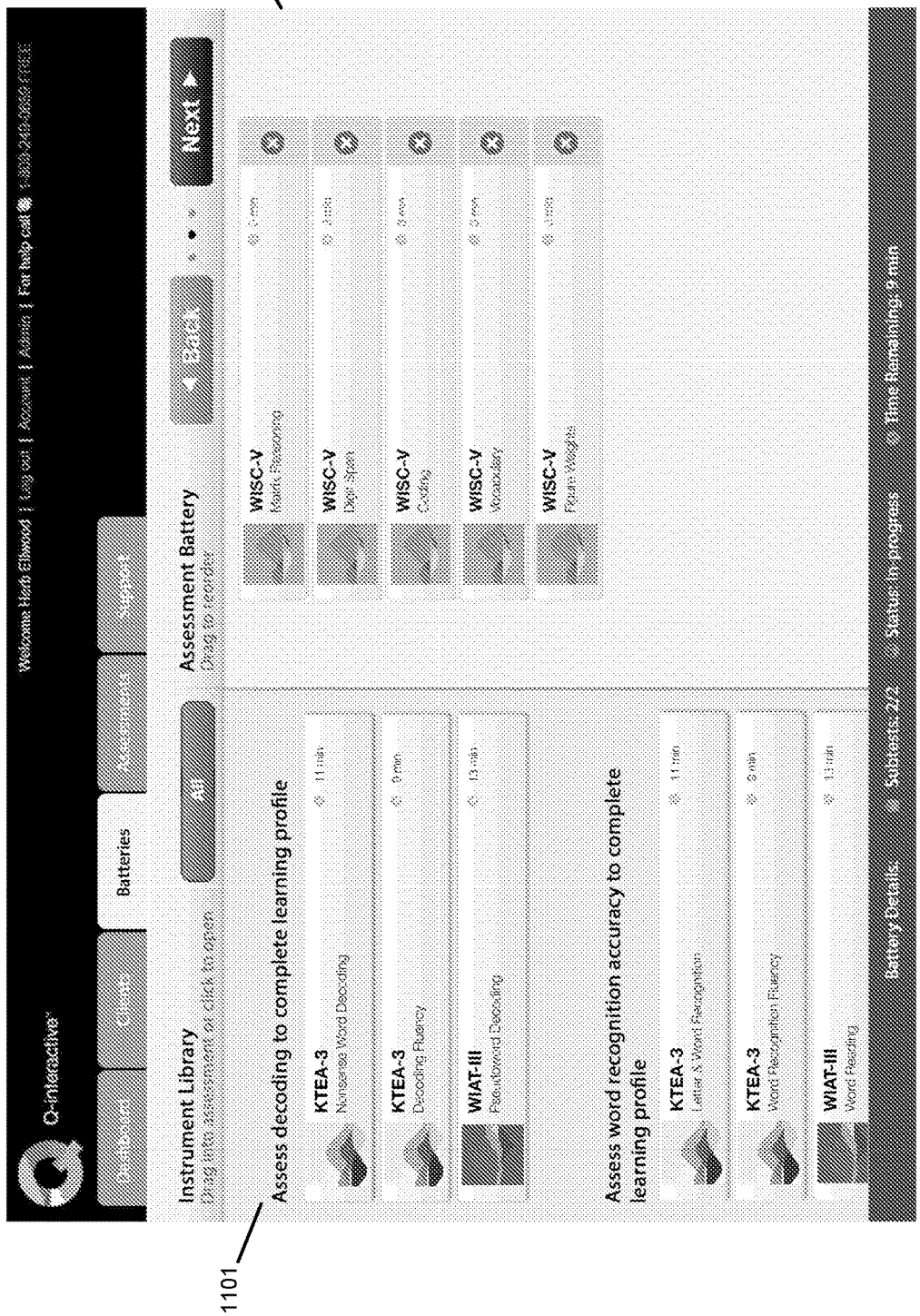
FIG. 11 is an example user interface display screen outputting an initial assessment battery of interactive content resources for a particular content receiver, according to one or more embodiments of the disclosure.

For example, referring briefly to FIG. 11, an example user interface is shown in which a content executor operating an execution device 710 has been presented with an initial set of diagnostic modules within an "Instrument Library" 1101. In this example, the content executor may drag selections of diagnostic modules from the library 1101 to the "Assessment Battery" 1102 to be executed during the clinical diagnosis session. After the content executor finalizes the initial set of diagnostic modules to be executed, the content executor may commence the execution session (e.g., via the "Next" button), at which time the selected diagnostic modules (or assessments) in the assessment battery 1102 may be retrieved by the execution device 710, from the diagnostic analyzer server 720 and/or directly from a content resource library 730.

As shown in this example, the content executor may be provided the functionality to select, via drag-and-drop or other techniques, which initial set of diagnostic modules are to be executed. However, in other examples, initial set of diagnostic modules may be determined automatically, by the execution device 710 and/or the diagnostic analyzer server 720. These automatically determined initial sets of diagnostic modules may be fixed and uneditable by the user in some cases, thus rendering steps 901 and 902 unnecessary, while in other cases, automatically determined initial sets of diagnostic modules may be editable by the user. In either case, the initial diagnostic modules may correspond to a standard battery of assessments to be provided to the content recipient end user (e.g., patient, student, etc.) as a starting point to commerce the clinical diagnosis.

In some embodiments, the initial diagnostic modules selected by the execution device 710 and/or the diagnostic analyzer server 720 may be based on jurisdictional requirements for clinical diagnosis, so that the modules/assessments may be selected based on the current location or jurisdiction (e.g., country, state, city, county, school or school district, etc.) of the content execution device 710 and/or the content receiver device 740. Such jurisdictional requirements may be enforced by the diagnostic analyzer server 720 and/or the execution device 710, which may use device location data (e.g., GPS data, LAN or access network data, etc.) to determine the location/jurisdiction in which the clinical assessment is being performed, and then providing the appropriate diagnostic modules. Additionally or alternatively, the standard set of initial assessments may be based on characteristics of the content recipient, such as the age, medical history, previous diagnoses, current academic performance levels, etc. For instance, based on an age of a student content recipient to be diagnosed, and a note or checklist from the student's teacher or parent identifying specific learning or behavior concerns, the diagnostic analyzer server 720 might automatically select an initial set of diagnostic modules to be provided to the execution device 710. In still other examples, the initial set of diagnostic modules (as well as subsequent selections of diagnostic modules) may be selected based on the access credentials of the content executor. For instance, the access credentials of a particular clinician, which may be based the clinician's professional credentials, experience, etc., may be used to determine the available diagnostic modules that may or may not be executed, monitored, and scored by the particular clinician.

Steps 904-906, which may be performed for each of the diagnostic modules (or assessments) in the initial battery, correspond to the execution of the assessment and the receiving of responses/feedback from the receiver device 740. In step 904, the content execution device 710 may initiate the execution of one or more of the assessments selected in steps 901-903. As discussed above, the context executor may initiate the execution of the diagnostic modules using the execution device 710, and based on the Bluetooth pairing or other network connection established between the execution device 710 and the receiver device 740, along with the corresponding communications between the active client applications running on the execution device 710 and the receiver device 740, the execution of the assessment on the execution device 710 may cause individual interactive assessment components (e.g., questions or other diagnostic/assessment content) to be transmitted to and rendered on the receiver device 740.

In step 905, during an execution session for a particular assessment, the execution device 710 may continuously monitor and/or modify the execution process as experienced at the receiver device 740. For example, in some embodiments, the content executor may be authorized to terminate an assessment early, restart an assessment, or navigate to different sections/questions of an assessment during the execution. Such modifications may be performed by the execution device 710, in response to commands from the content executor or automatically based on real-time evaluations of the responses/feedback received from the content recipient (or examinee). For example, an in-progress assessment execution may be automatically terminated early by the execution device 710, based on a determination of a passing or failing score or based on real-time computation of diagnostic algorithm(s) identifying probability of presence or absence of specific expression(s) of disorder(s) in question made before the end of the assessment. Likewise, if the response data indicates that the examinee has become distracted or confused during the course of the assessment, based on responses and/or additional data such as response times, facial expression, eye movement, etc., then the execution device 710 may automatically re-start the assessment or return to the point in the assessment at which the examinee's comprehension diverged. Additionally, in some embodiments, some of the response/feedback data generated during the execution of an assessment may be the responses or feedback of the content executor (rather than the examinee), for example, based on interactions with or observations of examinee during the assessment. Such responses or feedback may include verbal responses or feedback provided by the examinee to the content executor/clinician, behavioral or emotional cues, etc.

In step 906, the results of the assessment (e.g., responses, scores, and/or any additional examinee data or environmental data collected during the execution) may be transmitted to and stored by the execution device 710. The transmission and storage of assessment results may occur only after each assessment (e.g., test, subtest, or diagnostic module) is completely, or may occur one or more times during assessment executions, such as after each assessment question/response or after each section is completed, etc.

After each of the diagnostic modules/assessments in the initial battery have been executed and evaluated in steps 904-906, the execution device 710 may transmit the results (e.g., assessment scores and/or other user feedback or relevant data points) to the diagnostic analyzer server 720 in step 907. As discussed above, the diagnostic analyzer server 720 may analyze the assessment results (and/or any additional context data such as facial expressions or other observations of the examinee, or environmental conditions associated with the assessment), and then select one or more additional diagnostic modules (or assessments) for execution during the clinical diagnosis of the examinee.

For instance, in some embodiments, the diagnostic analyzer server 720 may compare the scores collected for the content recipient, from the initial set of executed assessments, to one or more diagnostic profiles. Referring briefly to FIGS. 12A-12B, two example charts 1200 are shown illustrating mappings of sets of score to several different diagnostic profiles. FIG. 12A is a generic mapping between characteristics and diagnoses, and FIG. 12B is a specific example mapping relating to dyslexia and other learning disorders. Such mappings may be used, along with the additional data analyses described below, to identify one or more possible diagnoses for the content recipient, based on the assessment scores. Additionally, as described below, the mappings may be used to help select additional diagnostic modules/assessments for recommendation by the diagnostic analyzer 720.

Figure 13:
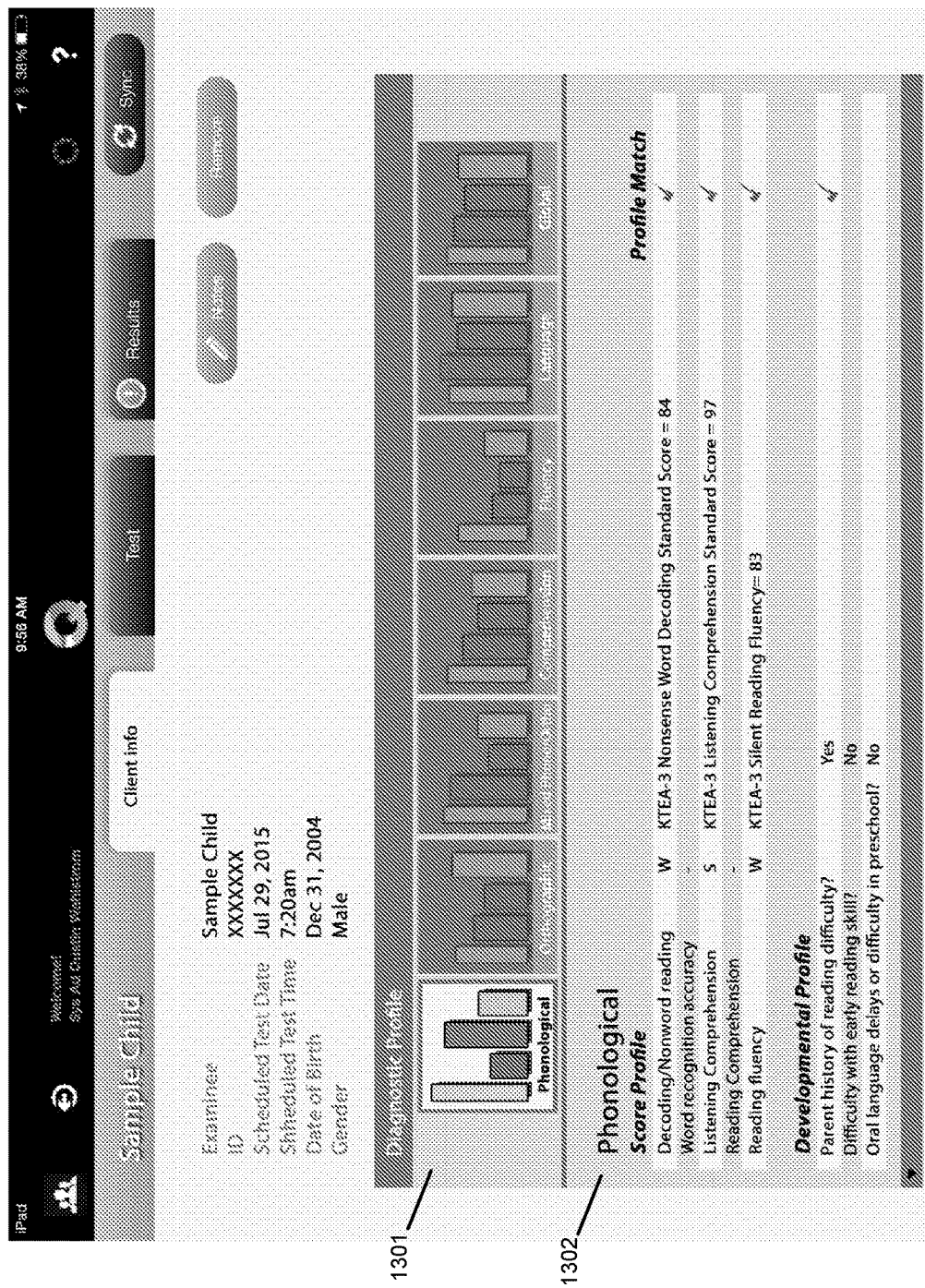
FIG. 13 is an example user interface display screen outputting diagnostic profile data corresponding to a particular user, according to one or more embodiments of the disclosure.
Figure 14:
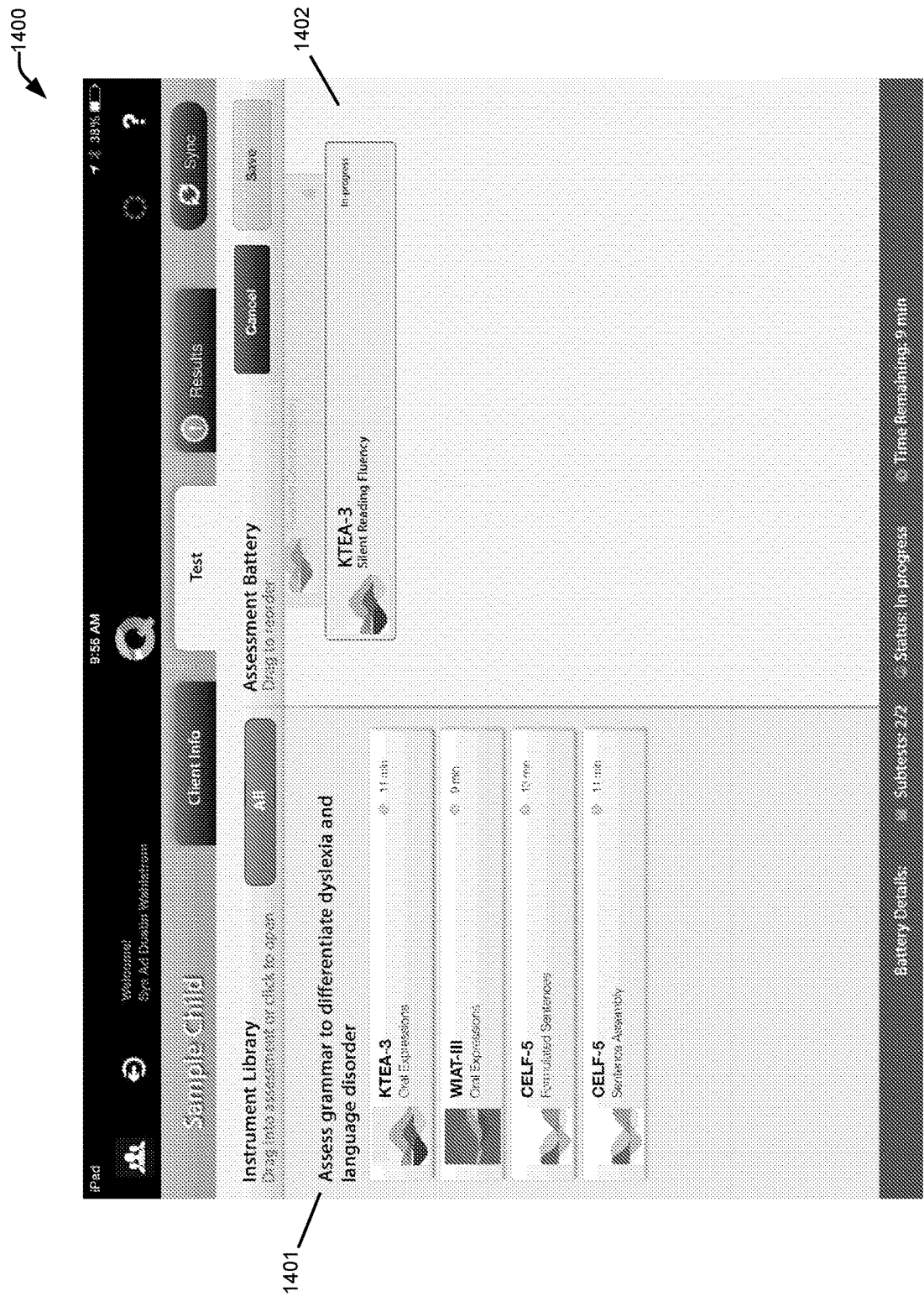
FIG. 14 is an example user interface display screen outputting additional assessments of interactive content resources selected for a particular content receiver by a diagnostic analyzer server, according to one or more embodiments of the disclosure.

In FIG. 13, an example user interface 1300 is shown including graphical representations of a set of assessment scores for a particular content recipient ("Sample Child"), along with a corresponding analyses that identifies which possible diagnoses (e.g., dyslexia and/or learning disorders) are consistent with the assessment scores for the examinee. Finally, in FIG. 14, another example user interface 1400 is shown including an additional set of diagnostic modules that have been selected by the diagnostic analyzer server 720 for subsequent execution by the execution device 710 during the clinical diagnosis of the examinee. These diagnostic modules selected by the diagnostic analyzer server 720 may be selected based on the above determinations of the possible and/or probable diagnoses for the examinee. As shown in this example, the additional diagnostic modules selected by the diagnostic analyzer server 720 are presented within the "Instrument Library" section of the user interface 1401, so that the content executor may drag selections of diagnostic modules from the library 1401 to the "Assessment Battery" section of the user interface 1302 to initiate their execution during the clinical diagnosis session of the examinee.

As illustrated above, the diagnostic analyzer server 720 may select additional assessments for execution based on the examinee's previous assessment scores, and particularly by a determination of which diagnoses are consistent with the previous assessment scores. Additional examples of the various techniques, data sources, and algorithms that the diagnostic analyzer server 720 may use to select additional diagnostic modules to be executed for the examinee during the clinical diagnosis are described below in more detail with reference to FIG. 10. Finally, after the diagnostic analyzer server 720 determines the additional assessments, data identifying the assessments (and/or the assessment software objects themselves) may be transmitted from the diagnostic analyzer server 720, and received by the execution device 710 in step 908.

Figure 10:
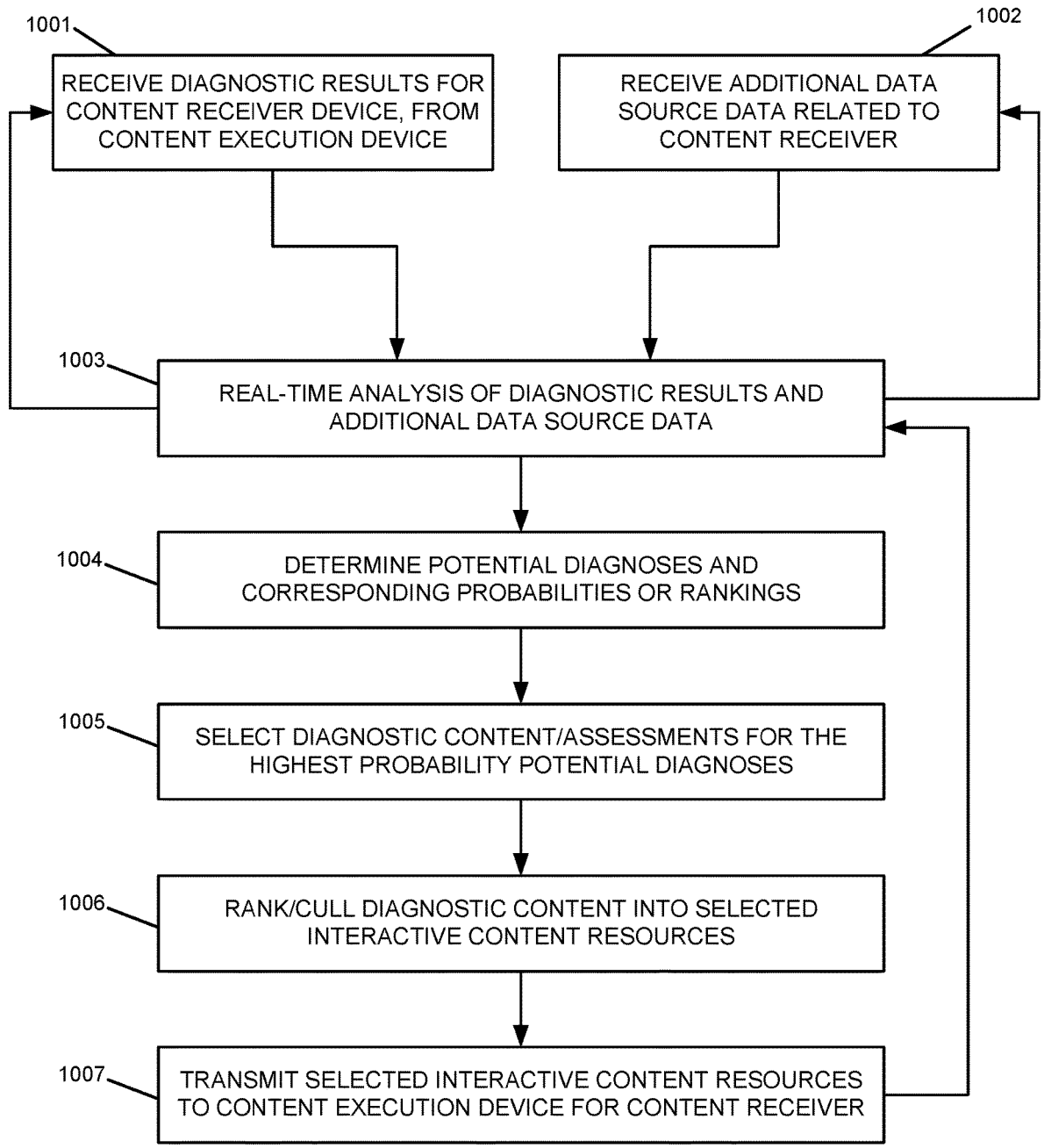
FIG. 10 is a flow diagram illustrating an example process of analyzing the execution results of diagnostic modules, and selecting additional diagnostic modules for a particular content receiver, according to one or more embodiments of the disclosure.

Referring now to FIG. 10, a flow diagram is shown illustrating a process of analyzing the execution results of diagnostic modules for a particular content recipient (or examinee), and/or additional data related to the content recipient from various data sources, and selecting a subsequent set of diagnostic modules for execution during a clinical diagnostic session for the content recipient. As described below, the steps in this process may be performed by one or more components in the diagnostic and content selection system 700 described above. For example, each of the steps 1001-1007 may be performed by a diagnostic analyzer server 720 in communication with a content execution device 710 (and/or a receiver devices 740) executing the assessment content and transmitting results to the diagnostic analyzer server 720. However, in other examples, some or all of the steps 1001-1007 may be performed directly by or in conjunction with an execution device 710 and/or receiver device 740, and thus the analyzer server 720 may be optional in such embodiments. It should also be understood that the various features and processes described herein, including receiving and analyzing the results of diagnostic assessments, and selecting additional assessments/diagnostic modules for examinees, need not be limited to the specific systems and hardware implementations described above in FIGS. 1-7.

In step 1001, a diagnostic analyzer server 720 may receive a set of execution results for one or more sets of diagnostic modules, where the execution results identify and/or are associated with a particular content recipient. As discussed above, in certain embodiments the diagnostic modules may be software modules containing interactive content resources to execute clinical assessments and collect response data from an examinee. In some embodiments, the execution of the diagnostic modules may be initiated by a content executor user (e.g., a clinician, teacher, or medical professional) on a content execution device 710, which may cause the interactive content to be transmitted to and displayed on a separate content receiver device 740 operated by the examinee (e.g., a student or patient). In such cases, the execution device 710 may collect the assessment results and/or user responses or feedback from the receiver device 740, and transmit them back to the diagnostic analyzer server 720 in step 1001. Depending on the particular system implementation, the diagnostic results received in step 1001 may correspond to one or more assessments (e.g., subtests, tests, or groups of tests), or may correspond to user responses/feedback to individual assessment items (e.g., a single question). Additionally, as discussed above, the data received in step 1001 need not be limited only to examinee answers of assessment questions, but also may include additional user responses/feedback such as the notes or observations of the clinician, comments from the examinee, facial expression or body language data of the examinee, etc. Additional data received in step 1001 may include optional additional data related to the execution of the diagnostic modules, such as data identifying the content executor, specifications of the execution device 710 and/or receiver device 740, execution time or location, environmental conditions associated with the assessment such as movement, background noise, temperature, etc.

In step 1002, the diagnostic analyzer server 720 may receive from one or more additional data sources (e.g., servers other than the diagnostic analyzer server 720, execution device 710, or receiver device 740) additional data relating to the examinee. The additional data received in step 1002 may include, for example, an initial (pre-testing) diagnosis of the examinee from a parent, teacher, psychologist or other medical professional, or other individual familiar with the examinee. Such pre-testing diagnosis may take the form of a list of concerns or behavior characteristics about the examinee based on direct observation, a hypothesis as to the clinical diagnosis of the examinee, and/or any other comments or relevant data points about the examinee. Additional data received in step 1002 may include any previous assessment results, academic records, medical or educational records of the examinee, family history data, or any other relevant data points that the diagnostic analyzer server 720 may use to determine potential diagnoses, compute probabilities, and select diagnostic modules for the examinee.

In step 1003, the diagnostic analyzer server 720 may initiate a real-time (or near real-time) analysis of the clinical diagnostic results data received in step 1001 and/or the additional examinee data received in 1002. As discussed below in more detail, the analysis in step 1003 may initiate processes by which one or more potential diagnoses are determined for the examinee, probabilities are calculated for each potential diagnoses, and additional diagnostic modules are selected to confirm or refute the potential diagnoses for the examinee. In some embodiments, the analysis in step 1003 may be initiated immediately in response to the diagnostic analyzer server 720 receiving a new set of diagnostic results (step 1001) or receive additional examinee data from an external data source (step 1002). As noted in this example, the analysis initiated in step 1003 may be performed in real time (or near real time), thereby allowing the diagnostic analyzer server 720 to select and transmit the additional diagnostic modules/assessments to execution devices 710 so that a clinical assessment may continue uninterrupted and without significant delay to the clinician or examinee. However, in other examples, the analysis initiated in step 1003 need not be performed in real time in response to new data received in steps 1001-1002, but may be initiated only after receiving a threshold amount of diagnostic results (e.g., a completed assessment or battery), or may be initiated in accordance with a scheduling process on the diagnostic analyzer server 720.

Additionally, although this example shows that data may be received via step 1001 and step 1002, in other examples the analysis in step 1003 may be initiated based only on a set of diagnostic results received in step 1001, without receiving or having any additional data relating to the examinee (e.g., without step 1002), or vice versa, where the analysis in step 1003 may be initially performed based on available data relating to the examinee but without any diagnostic results (e.g., without step 1001). In some embodiments, the analysis in step 1003 may be triggered or initiated by a process/service running continuously on the diagnostic analyzer server 720, so that an updated analysis in step 1003 may be automatically triggered whenever any new data is received via step 1001 or step 1002.

In step 1004, the diagnostic analyzer server 720 may determine one or more potential diagnoses for the examinee, based on the data diagnostic results data received for the examinee in steps 1001 and/or the additional examinee data received in step 1002. The diagnostic analyzer server 720 also may calculate probabilities and/or rankings for the potential diagnoses in step 1004. In some embodiments, the determination of potential diagnosis for the examinee may include mapping the examinee's assessment results to one or diagnoses consistent with those results. For instance, referring again to the mappings of FIGS. 12A-12B, each diagnostic module/assessment may correspond to one or more characteristics (in FIG. 12A) or constructs (in FIG. 12B), and the mappings 1200 may be used to determine to what level are the examinee's assessment scores/results consistent as well as those inconsistent (e.g., positive and negative diagnostic indicators) with the diagnoses listed on the top lines.

To illustrate the mapping of constructs (or characteristics, skills, etc.) to potential diagnoses, the example mapping 1200b in FIG. 12B may be used to identify potential diagnoses of dyslexia or other reading/learning disorders. Using this example, if an execution of an initial set diagnostic modules/assessments for an examinee reveals that the examinee's listening comprehension skills are adequate, but his/her word recognition skills are weak, the diagnostic analyzer server 720 may use mapping 1200b in FIG. 12B to determine that these diagnostic results are entirely consistent with both orthographic and mixed dyslexia. Accordingly, the diagnostic analyzer server 720 may designate orthographic and mixed dyslexia as the highest probability or highest ranked potential diagnoses. Additionally, the examinee's results are entirely consistent with phonological dyslexia, but only have a single matching data point instead of two. Thus, phonological dyslexia may be assigned a probability or ranking just below the orthographic and mixed dyslexia in this example. Further, although the examinee's results are not entirely consistent with a language disorder or a global reading disorder, there is one data point of consistency with these diagnosis, and it is possible that additional listening comprehension assessments may in fact reveal that the examinee has weak (rather than adequate) listening comprehension skills. Therefore, the diagnostic analyzer server 720 may determine that the potential diagnoses of a language disorder or a global reading disorder should be assigned a probability or ranking below the three dyslexia diagnoses, followed by the language disorder diagnosis which has no points of consistency and one point of inconsistency with the examinee's assessment results. Finally, a reading comprehension disorder diagnosis may be assigned the lowest ranking or probability in this example, because it has no points of consistency and two points of inconsistency with the examinee's assessment results. Thus, in this example, the analyzer server 720 may potentially select one or more Decoding assessments and/or Spelling by Dictation assessments to be administered by a clinician, in order increase the probability of mixed dyslexis and refine the diagnosis. Additionally, further embodiments may determine the impact of supporting abilities and behaviors in the expression of mixed diagnostic profiles (e.g. attentional, memory, executive, emotional, etc. . . . disturbances).

As noted above, a single diagnostic module may be executed to assess the examinee's proficiencies with respect to a single construct (or characteristic, skill, trait, etc.). In other examples, a single diagnostic module may yield assessment results for the examinee under multiple constructs. Additionally, in some embodiments, many different assessments may be available within the content resource library to assess a single construct. For example, it should be understood that dozens or even hundreds of different diagnostic assessments may be published by various different content providers to assess a student's reading comprehension, word recognition, spelling proficiency, etc. Thus, both the logic within the diagnostic analyzer server 720, as well as the content executor, may determine that several different assessments should be executed for a particular construct, in order to perform a more thorough clinical diagnostic for the particular construct. Additionally, although this example shows only broad classifications for different constructs (e.g., Adequate, Weak), in other examples, assessment results may take the form of letter grades or numerical scores (e.g., 1-100), color gradients illustrating risk level, likelihood ratios, or the like, which may be compared to different values or ranges of values within the mappings for different diagnoses.

Alternatively, or in addition to, comparing assessment results to diagnoses mappings as described above, the diagnostic analyzer server 720 also may determine the probabilities and/or rankings for potential diagnoses in step 1004 based on statistical or analytics data relating to the potential diagnoses. For example, if the examinee's assessment results are consistent with multiple different diagnoses (based on a comparison of the assessment results to constructs/characteristics), then the diagnostic analyzer server 720 may retrieve data from one or more external data sources (e.g., a response-diagnosis analytics data store 725) to determine overall statistical probability associated with each of the potential diagnosis. Referring again to the example mapping 1200b, if the examinee's initial assessment results were consistent with all three types of dyslexia and/or other learning disorders, then diagnostic analyzer server 720 may assign the probabilities/rankings based on the prevalence of each disorder. In some embodiments, the diagnostic analyzer server 720 may use the overall prevalence rates of a diagnosis across the general population, while in other cases subset prevalence rates applicable to the examinee's profile (e.g., prevalence by age, grade, gender, geographic region, having a particular medical condition, etc.) may be used. Further, the diagnostic analyzer server 720 may consider additional factors when determining the diagnosis probabilities/rankings in step 1004, such as weighting the probabilities/rankings based on an initial (pre-assessment) diagnosis of the examinee from a parent, teacher, psychologist, etc., or based on direct observations of the examinee recorded by the content executor during the assessment. Additional factors in calculating the probabilities/rankings for the diagnoses may include the examinee's previous assessment results, academic records, medical or educational records, family history data, or any other relevant data points.

In step 1005, based on the probabilities/rankings for the different diagnoses determined in step 1004, the diagnostic analyzer server 720 may select a plurality of additional diagnostic content (e.g., assessments) to be presented to the examinee during the clinical diagnostic session. In some embodiments, the selection of assessments/diagnostic modules in step 1005 may be targeted based on the highest probability diagnosis determined in step 1004. For instance, if step 1004 determined a highest-probability diagnosis of orthographic dyslexia for the examinee, the assessments selected in step 1005 may be those assessments that specifically target orthographic dyslexia, including assessments that may attempt to definitely confirm or rule-out that diagnosis, or to definitely confirm or rule-out particular constructs or characteristics associated with that diagnosis. In contrast, assessments that only target the lower probability/ranking diagnoses from step 1004 (or the constructs/characteristics associated with those diagnoses) might not be selected in step 1005. Further, in some embodiments, rather than limiting the selection in step 1005 to assessments associated with the single highest probability/ranking diagnosis, assessments may be selected that are associated with several of the high probability/ranking diagnoses (e.g., the top 2, 3, 4, . . . , N, diagnoses, or any diagnosis with a probability greater than a particular threshold, etc.). Additionally, in some cases, assessments that are relevant to multiple of the high probability/ranking diagnoses (e.g., a series of oral reading assessments which are relevant to multiple potential high-probability diagnoses) may be weighted more than assessments that are relevant to only a single high probability/ranking diagnosis. Instances not identifying a single high probability diagnosis within the initial expected range of diagnosis may direct the examinee to a new set of protocols and most probable diagnostic cluster(s) (e.g., ADHD).

In step 1006, the diagnostic analyzer server 720 may rank (or cull) the plurality of additional diagnostic content (e.g., assessments) selected in step 1005, thereby determining a smaller subset of assessments to be transmitted and presented to the content executor and/or examinee. The subset of assessments/diagnostic modules may be selected in step 1006 based on any number of algorithms for determining the most valuable assessments to be executed for and/or by the examinee as part of the examinee's clinical diagnostic session. Such algorithms, several examples of which are described below, may be designed with the goals of expediting the clinical diagnostic session of the examinee (e.g., by executing more relevant and revealing assessments earlier in the session, and by not selecting irrelevant or redundant assessments for execution), and improving the overall end product of the clinical diagnostic session (e.g., achieving higher statistical likelihoods for potential diagnoses, and more definitely ruling out unlikely diagnoses).

In some embodiments, the value of an assessment may be determined in step 1006 as a measurement of the magnitude of the likely change (either positive or negative) in the probabilities of the highest probability diagnoses, that will result in the execution of the assessment at this point in the examinee's clinical diagnostic session. In other words, assessments that are likely to cause a large increase in the probability of one or more diagnoses (e.g., helping to confirm those diagnoses) and/or a large decrease in the probability of one or more diagnoses (e.g., helping to rule-out those diagnoses) will be selected as more valuable assessments at this point in the diagnostic session, over other assessments that likely to cause a relatively small increases and/or decreases in the probabilities of the diagnoses (e.g., providing less help in either confirm or ruling out those diagnoses). Thus, for each potential assessment evaluated for selection in step 1006, a corresponding measurement of the likely magnitude change (or delta) may be calculated and/or retrieved for each of the potential diagnoses associated with the examinee. As an example, referring again to mapping 1200b, for a particular assessment within the reading comprehension field, the diagnostic analyzer server 720 may determine in step 1006 that the execution of the assessment is likely to change the probability a phonological dyslexia diagnosis by A %, the probability an orthographic dyslexia diagnosis by B %, the probability an mixed dyslexia diagnosis by C %, and so on. In other words, each of these percentage magnitudes answers the question: if Assessment A is executed at this point in the examinee's clinical diagnostic session, is the confidence level in Diagnosis B likely to be higher or lower, and by how much? In some embodiments, only the magnitude of the likely change may be measured, and thus a likely change of −15% for a diagnosis is considered to be equally valuable as a likely change of +15%. While in other cases, a likely positive change in the diagnosis may be weighted as more valuable by the diagnostic analyzer server 720, or vice versa.

The algorithms and other techniques used to determine the magnitude of changes in the probabilities of the particular diagnoses that are likely to result from the execution of the particular assessment, may be based on a number of factors including statistical and/or analytical data retrieved from the response-diagnosis analytics data store 725.

A first factor used in computing the likely change in the probability delta of a diagnosis that will result from executing an assessment, may be a calculation in the confidence level in examinee's projected results for the assessment. This confidence level may be calculated using analytics data retrieved from the response-diagnosis analytics data store 725, based on the examinee's previous results on related assessments. For example, if the examinee has taken three previous assessment batteries in the field of written expression, and received consistent results on those assessment batteries, the response-diagnosis analytics data store 725 may determine that the results of those assessment batteries are highly predictive of what the examinee is likely to score on another particular written expression assessment. However, in other cases, the analytics analysis of the user's previous assessments may determine that the examiner's performance on a different selected assessment cannot be predicted with a high level of confidence. The analytics used to make such predictions may be based on a trained machine learning algorithm that analyses the examinee's pattern of assessment results against a data store of results from other examinees. The correlations and predictive abilities of certain assessment results (or combinations of results) to calculate the likely results of additional assessments may be determined within a particular construct, or there may be correlations/predictions based on assessments across constructs. Further, within a particular characteristic or construct, the analytics analysis may determine that a certain assessment (or combination of assessments) are highly predictive of some additional assessments, but are less predictive (or not at all predictive) of other addition assessments.

A second factor used in computing the likely change in the probability delta of a diagnosis that will result from executing an assessment, may be a calculation of the projected diagnosis probability, assuming that the examinee's results for the assessment are the anticipated results (e.g., the results anticipated based on the calculations in the first factor). In other words, even if the examinee performs as expected on an additional assessment, by what amount will that new score change the overall probability of the diagnosis. As an example, if an examinee has already received thorough testing within a particular construct area, even if the examination results are thus far conflicted, then an additional assessment battery that same construct area may have little change the overall probability of the diagnosis regardless of what results are received. As another example, depending on which diagnoses are currently ranked as the highest probability diagnoses, clinical testing within certain construct areas might not be particularly relevant to those diagnoses, regardless of what results are received from the assessments. In both of these cases, the likely change in the probability delta for the selected assessments/batteries may be small, even if the examinee's projected scores selected assessments/batteries cannot be predicted with a high level of confidence (e.g., using the calculation of first factor). The calculations associated with the second factor in this example (e.g., updated diagnosis probability changes based on assumed assessment results) also may be performed using data from the response-diagnosis analytics data store 725, and may involve similar or identical calculations to the initial diagnosis probability/ranking calculations discussed above in step 1004.

Using the above calculations, each of the assessments and/or diagnostic modules initially selected in step 1005 may be scored, and then ranked/culled to select the subset of assessments/diagnostic modules having the highest anticipated probability deltas for the current set of diagnoses. In other words, the subset of assessments/diagnostic modules selected in step 1006 may be those assessments/diagnostic modules that are most likely to result in larger increases and/or decreases in the probabilities of the higher ranking diagnoses (e.g., helping to either confirm or rule-out those diagnoses), rather than the assessments/diagnostic modules that are likely to result in smaller increases/decreases in these probabilities (e.g., providing less help in either confirm or ruling out those diagnoses).

The assessment subset selection in step 1006 may be based on further additional factors as well, such as the execution time or cost of an assessment (e.g., favoring lower cost and time assessments so that more overall assessments may be executed during the diagnostic session). In some embodiments, the number of additional assessments/diagnostic modules selected in step 1006 may be based on an anticipated execution time of the selected content (e.g., 30 mins, 1 hour, etc.), which may be provided by the content executor (e.g., clinician) or preset by the diagnostic analyzer server 720. Additionally, the assessments/diagnostic modules may be filtered out based on the authorization credentials of either the examinee and/or the content executor (e.g., clinician), or based on the location-based content restrictions (e.g., when certain assessments are preferred, not preferred, or invalid within certain jurisdictions, etc.).

Finally, in step 1007, the subset of assessments/diagnostic modules selected in step 1006 may be packaged and/or transmitted to the content executor device 710 for execution during the clinical diagnostic session as described above. In some cases, the diagnostic analyzer server 720 may package multiple selected assessments into customized diagnostic modules before transmission, thereby allowing the diagnostic analyzer server 720 to select transmit only the most valuable assessment parts (e.g., tests or subtests), so that the less valuable assessment parts (e.g., tests or subtests) need not be executed during the session.

A limited number of embodiments of the present invention have been described, but the invention contemplates many more that are enabled by the description. For example, the concepts of the invention are applicable to performing analyses and selections of assessments as well as any other types of interactive content resources, including media resources, professional training and educational resources, interactive gaming resources, interactive eCommerce resources, etc. A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system, comprising:
  a content execution device, including:
    a processing unit comprising one or more processors;
    a plurality of network interfaces; and
    memory coupled with and readable by the processing unit and storing therein a set of instructions which, when executed by the processing unit, causes the execution device to:
      receive a selection of diagnostic modules for execution on a content receiver device;
      initiate execution of the selected diagnostic modules by transmitting first interactive content within particular diagnostic modules to the content receiver device;
      after the execution of the selected diagnostic modules, determine performance measurements for the selected diagnostic modules based on received responses to the interactive content, wherein the performance measurements are associated with a recipient of the first interactive content;
      transmit the determined performance measurements to a diagnostic analyzer server;
      receive selections of a subsequent diagnostic module from the diagnostic analyzer server; and
      initiate execution of the subsequent diagnostic module by transmitting second interactive content to the content receiver device;
  the diagnostic analyzer server comprising:
    a processing unit comprising one or more processors; and
    memory coupled with and readable by the processing unit and storing therein a set of instructions which, when executed by the processing unit, causes the diagnostic analyzer server to:
      receive the determined performance measurements from the content execution device;
      retrieve a previously-collected entity record associated with the recipient;
      determine the subsequent diagnostic module based on the determined performance measurements and the previously-collected entity record; and
      transmit an identification of the subsequent diagnostic module to the content execution device.

2. The system of claim 1, wherein the memory of the diagnostic analyzer stores additional instructions that, when executed by the processing unit, causes the diagnostic analyzer server to determine the subsequent diagnostic module by:
  determining a plurality of possible diagnoses for the recipient based on the determined performance measurements and the previously-collected entity record;
  determining a probability ranking for the plurality of possible diagnoses; and
  determining the subsequent diagnostic module based on a highest probability diagnosis for the recipient.

3. The system of claim 2, wherein determining the probability ranking for the plurality of possible diagnoses comprises:
  determining an initial probability ranking for the plurality of possible diagnoses based on input received before the execution of the selected diagnostic modules; and
  revising the initial probability ranking based on the determined performance measurements.

4. The system of claim 2, wherein determining the probability ranking for the plurality of possible diagnoses comprises determining a probability for each of the plurality of possible diagnoses using a trained machine learning algorithm.

5. The system of claim 2, wherein determining the subsequent diagnostic module comprises:
  analyzing a plurality of diagnostic modules, each comprising one or more interactive content resources;
  calculating, for each particular interactive content resource in each of the diagnostic modules, a projected amount of change to the probability of the highest probability diagnosis, resulting from the execution of the particular interactive content resource; and
  determining the subsequent diagnostic module based on the calculated projected amounts of change to the probabilities.

6. The system of claim 5, wherein the projected amounts of change to the probability of the highest probability diagnosis are computed based on analytics data correlating probabilities for a plurality of diagnoses to a plurality of responses from a plurality of additional content recipients to the selected diagnostic modules.

7. The system of claim 1, wherein the determination of the subsequent diagnostic module comprises:
   determining one or more geographic regions associated with the recipient; and
   determining the subsequent diagnostic module based on the one or more geographic regions.

8. A method, comprising:
   initiating execution of a selected diagnostic module by transmitting first interactive content to a content receiver device;
   determining performance measurements for the selected diagnostic module based on received responses to the first interactive content, wherein the performance measurements are associated with a recipient of the first interactive content;
   retrieving a previously-collected entity record associated with the recipient;
   determining a subsequent diagnostic module based on the determined performance measurements and the previously-collected entity record; and
   initiating execution of the subsequent diagnostic module by transmitting second interactive content to the content receiver device.

9. The method of claim 8, wherein determining the subsequent diagnostic module includes:
   determining a plurality of possible diagnoses for the recipient based on the determined performance measurements and the previously-collected entity record;
   determining a probability ranking for the plurality of possible diagnoses; and
   determining the subsequent diagnostic module based on a highest probability diagnosis for the recipient.

10. The method of claim 9, wherein determining the probability ranking for the plurality of possible diagnoses comprises:
    determining an initial probability ranking for the plurality of possible diagnoses based on input received before the execution of the selected diagnostic module; and
    revising the initial probability ranking based on the determined performance measurements.

11. The method of claim 9, wherein determining the probability ranking for the plurality of possible diagnoses comprises determining a probability for each of the plurality of possible diagnoses using a trained machine learning algorithm.

12. The method of claim 9, wherein determining the subsequent diagnostic module comprises:
    analyzing a plurality of diagnostic modules, each comprising one or more interactive content resources;
    calculating, for each particular interactive content resource in each of the diagnostic modules, a projected amount of change to the probability of the highest probability diagnosis, resulting from the execution of the particular interactive content resource; and
    determining the subsequent diagnostic module based on the calculated projected amounts of change to the probabilities.

13. The method of claim 12, wherein the projected amounts of change to the probability of the highest probability diagnosis are computed based on analytics data correlating probabilities for a plurality of diagnoses to a plurality of responses from a plurality of additional content recipients to the selected diagnostic module.

14. The method of claim 8, wherein determining the subsequent diagnostic module comprises:
    determining one or more geographic regions associated with the recipient; and
    determining the subsequent diagnostic module based on the one or more geographic regions.

15. A method, comprising:
    displaying a first diagnostic module content on a content receiver device;
    determining performance measurements based on received responses from a recipient of the first diagnostic module content;
    retrieving a previously-collected data record associated with the recipient;
    determining a second diagnostic module content based on the performance measurements and the data record; and
    displaying the second diagnostic module content on the content receiver device.

16. The method of claim 15, wherein determining the second diagnostic module content includes:
    determining a plurality of possible diagnoses for the recipient based on the determined performance measurements;
    determining a probability ranking for the plurality of possible diagnoses; and
    determining the second diagnostic module content using the probability ranking.

17. The method of claim 16, wherein determining the probability ranking for the plurality of possible diagnoses comprises:
    determining an initial probability ranking for the plurality of possible diagnoses; and
    revising the initial probability ranking based on the determined performance measurements.

18. The method of claim 17, wherein determining the initial probability ranking comprises determining a probability for each of the plurality of possible diagnoses using a trained machine learning algorithm.

19. The method of claim 17, wherein determining the second diagnostic module content comprises:
    determining a content relationship between the first diagnostic module content and the second diagnostic module content; and
    determining the second diagnostic module content using the content relationship.

20. The method of claim 15, wherein determining the second diagnostic module content comprises:
    determining an attribute associated with an administrator that caused the first diagnostic content to be displayed on the content receiver device; and
    determining the second diagnostic module content based on the attribute associated with the administrator.

\* \* \* \* \*